United States Patent
Kim et al.

(10) Patent No.: US 10,542,531 B2
(45) Date of Patent: Jan. 21, 2020

(54) METHOD AND APPARATUS FOR TRANSMITTING AND RECEIVING DOWNLINK CONTROL CHANNEL IN WIRELESS COMMUNICATION SYSTEM

(71) Applicant: Samsung Electronics Co., Ltd., Gyeonggi-do (KR)

(72) Inventors: Tae-Hyoung Kim, Seoul (KR); Yong-Jun Kwak, Gyeonggi-do (KR); Dong-Han Kim, Gyeonggi-do (KR); Young-Bum Kim, Seoul (KR); Seung-Hoon Choi, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/842,369

(22) Filed: Dec. 14, 2017

(65) Prior Publication Data

US 2018/0167920 A1    Jun. 14, 2018

(30) Foreign Application Priority Data

Dec. 14, 2016    (KR) .......................... 10-2016-0170605

(51) Int. Cl.
*H04W 72/04* (2009.01)
*H04L 1/00* (2006.01)
*H04L 5/00* (2006.01)
*H04W 88/02* (2009.01)

(52) U.S. Cl.
CPC ......... *H04W 72/042* (2013.01); *H04L 1/0009* (2013.01); *H04L 5/0048* (2013.01); *H04W 88/02* (2013.01)

(58) Field of Classification Search
CPC ............................ H04W 72/042; H04W 88/02
See application file for complete search history.

(56) References Cited

U.S. PATENT DOCUMENTS

| | | | |
|---|---|---|---|
| 9,210,736 B2* | 12/2015 | Kim | H04L 5/0053 |
| 9,369,248 B2* | 6/2016 | Cheng | H04L 5/0053 |
| 2009/0232309 A1* | 9/2009 | Montojo | H04K 1/00 380/270 |
| 2009/0238091 A1* | 9/2009 | Kim | H04L 5/0091 370/252 |
| 2009/0257385 A1* | 10/2009 | Meylan | H04L 1/0045 370/329 |

(Continued)

OTHER PUBLICATIONS

Nokia, Alcatel-Lucent Shanghai Bell, "On the DL Control Channel Structure for NR", R1-1612235, 3GPP TSG-RAN WG1 #87, Nov. 14-18, 2016, 4 pages.

(Continued)

*Primary Examiner* — Parth Patel
(74) *Attorney, Agent, or Firm* — The Farrell Law Firm, P.C.

(57) ABSTRACT

Disclosed is a 5G or a pre-5G communication system provided to support a higher data transmission rate than a 4G communication system such as LTE. A method and an apparatus are provided for transmitting and receiving a downlink control channel in a wireless communication system. The method includes transmitting, on a first resource region, a detection signal indicating that a downlink control channel is transmitted; and transmitting a signal of the downlink control channel on a search space related to the first resource region.

16 Claims, 16 Drawing Sheets

(56) References Cited

U.S. PATENT DOCUMENTS

| | | | | |
|---|---|---|---|---|
| 2010/0279628 A1* | 11/2010 | Love | H04L 5/003 | 455/70 |
| 2010/0331030 A1* | 12/2010 | Nory | H04L 5/0053 | 455/509 |
| 2011/0085506 A1* | 4/2011 | Lee | H04L 5/0023 | 370/329 |
| 2011/0255485 A1* | 10/2011 | Chen | H04W 72/0453 | 370/329 |
| 2012/0009923 A1* | 1/2012 | Chen | H04L 5/0053 | 455/434 |
| 2012/0099546 A1* | 4/2012 | Cho | H04L 1/1607 | 370/329 |
| 2012/0120868 A1* | 5/2012 | Park | H04B 7/2606 | 370/315 |
| 2012/0140727 A1* | 6/2012 | Ng | H04W 72/042 | 370/329 |
| 2012/0182950 A1* | 7/2012 | Chung | H04L 5/0053 | 370/329 |
| 2012/0320782 A1* | 12/2012 | Seo | H04L 1/1854 | 370/252 |
| 2013/0034072 A1* | 2/2013 | Kim | H03M 13/3738 | 370/329 |
| 2013/0100899 A1* | 4/2013 | Kim | H04W 28/16 | 370/329 |
| 2013/0100938 A1* | 4/2013 | Kwon | H04L 27/2655 | 370/336 |
| 2013/0163573 A1* | 6/2013 | Oizumi | H04L 5/0007 | 370/336 |
| 2013/0308568 A1* | 11/2013 | Chen | H04W 72/0406 | 370/329 |
| 2014/0016596 A1* | 1/2014 | Kim | H04L 5/001 | 370/329 |
| 2014/0036747 A1* | 2/2014 | Nory | H04W 72/0406 | 370/311 |
| 2014/0036803 A1* | 2/2014 | Park | H04W 72/042 | 370/329 |
| 2014/0050139 A1* | 2/2014 | Piggin | H04W 72/005 | 370/312 |
| 2014/0050165 A1* | 2/2014 | Park | H04W 72/0413 | 370/329 |
| 2014/0071918 A1* | 3/2014 | Park | H04W 72/14 | 370/329 |
| 2014/0071952 A1* | 3/2014 | Kim | H04L 5/001 | 370/335 |
| 2014/0078978 A1* | 3/2014 | Cheng | H04L 5/0053 | 370/329 |
| 2014/0092836 A1* | 4/2014 | Park | H04L 1/0038 | 370/329 |
| 2014/0105150 A1* | 4/2014 | Kim | H04B 7/0417 | 370/329 |
| 2014/0233520 A1* | 8/2014 | Lee | H04B 7/0456 | 370/329 |
| 2014/0254420 A1* | 9/2014 | Kim | H04L 5/001 | 370/252 |
| 2014/0269519 A1* | 9/2014 | Shan | H04L 5/0051 | 370/329 |
| 2014/0301286 A1* | 10/2014 | Abe | H04L 5/0023 | 370/329 |
| 2014/0301343 A1* | 10/2014 | Park | H04L 5/0053 | 370/329 |
| 2014/0301359 A1* | 10/2014 | Seo | H04L 5/0007 | 370/330 |
| 2014/0307690 A1* | 10/2014 | Kim | H04B 7/2656 | 370/329 |
| 2014/0321414 A1* | 10/2014 | Chun | H04L 5/0023 | 370/329 |
| 2014/0328312 A1* | 11/2014 | Seo | H04L 1/1861 | 370/329 |
| 2014/0342746 A1* | 11/2014 | Nakashima | H04L 5/0048 | 455/450 |
| 2014/0369437 A1* | 12/2014 | Horiuchi | H04B 7/0689 | 375/267 |
| 2014/0376456 A1* | 12/2014 | Kim | H04L 1/0046 | 370/329 |
| 2015/0003311 A1* | 1/2015 | Feuersaenger | H04W 52/0225 | 370/311 |
| 2015/0003316 A1* | 1/2015 | Kim | H04L 5/0055 | 370/312 |
| 2015/0009953 A1* | 1/2015 | Park | H04W 72/1273 | 370/330 |
| 2015/0043473 A1* | 2/2015 | Kim | H04L 1/1812 | 370/329 |
| 2015/0063318 A1* | 3/2015 | Merlin | H04L 47/12 | 370/336 |
| 2015/0117353 A1* | 4/2015 | Takeda | H04W 72/042 | 370/329 |
| 2015/0146639 A1* | 5/2015 | Seo | H04L 5/0053 | 370/329 |
| 2015/0181588 A1* | 6/2015 | Song | H04L 1/1607 | 370/280 |
| 2015/0201405 A1* | 7/2015 | Liu | H04W 72/04 | 370/329 |
| 2015/0208398 A1* | 7/2015 | Pan | H04L 5/001 | 370/329 |
| 2015/0230173 A1* | 8/2015 | Li | H04W 52/0212 | 370/311 |
| 2015/0296542 A1* | 10/2015 | Heo | H04W 74/0833 | 370/329 |
| 2015/0304088 A1* | 10/2015 | Seo | H04W 74/002 | 370/277 |
| 2015/0358137 A1* | 12/2015 | Chae | H04L 1/1854 | 370/329 |
| 2015/0358962 A1* | 12/2015 | Lee | H04W 72/0446 | 370/336 |
| 2016/0021644 A1* | 1/2016 | Seo | H04L 1/1854 | 370/315 |
| 2016/0269982 A1* | 9/2016 | Larsson | H04L 5/0014 | |
| 2016/0286558 A1* | 9/2016 | Chae | H04L 5/0055 | |
| 2016/0295560 A1 | 10/2016 | Chen et al. | | |
| 2017/0054531 A1* | 2/2017 | Chae | H04L 1/1861 | |
| 2017/0135084 A1* | 5/2017 | Kuchibhotla | H04L 5/0007 | |
| 2017/0135096 A1* | 5/2017 | Kuchibhotla | H04W 72/0406 | |
| 2017/0135116 A1* | 5/2017 | Kuchibhotla | H04L 43/087 | |
| 2017/0181135 A1* | 6/2017 | Chen | H04L 5/0048 | |
| 2017/0223687 A1* | 8/2017 | Kuchibhotla | H04W 72/044 | |
| 2017/0359805 A1* | 12/2017 | You | H04W 4/70 | |
| 2017/0373793 A1* | 12/2017 | Yerramalli | H04L 1/0038 | |
| 2018/0007664 A1* | 1/2018 | Gho | H04W 72/042 | |
| 2018/0035386 A1* | 2/2018 | Yamada | H04J 11/00 | |
| 2018/0167920 A1* | 6/2018 | Kim | H04L 1/00 | |
| 2018/0249446 A1* | 8/2018 | You | H04L 1/00 | |
| 2018/0254860 A1* | 9/2018 | Wong | H04L 1/1819 | |
| 2018/0368122 A1* | 12/2018 | Kuchibhotla | H04W 72/085 | |

OTHER PUBLICATIONS

NTT DOCOMO, Inc., "DL Control Channel Design for NR", R1-1612715, 3GPP TSG RAN WG1 Meeting #87, Nov. 14-18, 2016, 5 pages.

Guangdong OPPO Mobile Telecom, "Downlink Control Channel Design Consideration", R1-1611704, 3GPP TSG RAN WG1 Meeting #87, Nov. 14-18, 2016, 5 pages.

CATT, "NR DL Control Channel Structure", R1-1611390, 3GPP TSG RAN WG1 Meeting#87, Nov. 14-18, 2016, 4 pages.

International Search Report dated Mar. 14, 2018 issued in counterpart application No. PCT/KR2017/014707, 9 pages.

* cited by examiner

METHOD AND APPARATUS FOR TRANSMITTING AND RECEIVING DOWNLINK CONTROL CHANNEL IN WIRELESS COMMUNICATION SYSTEM

PRIORITY

This application claims priority under 35 U.S.C. § 119(a) to Korean Patent Application Serial No. 10-2016-0170605, which was filed in the Korean Intellectual Property Office on Dec. 14, 2016, the entire content of which is incorporated herein by reference.

BACKGROUND

1. Field of the Disclosure

The present disclosure relates generally to a method and an apparatus for monitoring a downlink control channel in order to reduce power consumption of a user equipment in a wireless communication system.

2. Description of the Related Art

In order to meet wireless data traffic demands, which have increased since the commercialization of the 4th Generation (4G) communication system, efforts to develop an improved 5G communication system or a pre-5G communication system have been made. For this reason, the 5G communication system or the pre-5G communication system is called a beyond-4G-network-communication system or a post-LTE system.

In order to achieve a high data transmission rate, implementation of the 5G communication system in an ultrahigh frequency (mmWave) band (e.g., 60 GHz band) is being considered. In the 5G communication system, technologies such as beamforming, massive MIMO, Full Dimensional MIMO (FD-MIMO), array antenna, analog beamforming, and large scale antenna technologies are being discussed as means to mitigate propagation path loss in the ultrahigh frequency band and increase a propagation transmission distance.

Further, the 5G communication system has developed technologies such as an evolved small cell, an advanced small cell, a cloud Radio Access Network (cloud RAN), an ultra-dense network, Device-to-Device communication (D2D), a wireless backhaul, a moving network, cooperative communication, Coordinated Multi-Points (CoMP), and received interference cancellation to improve the system network.

In addition, the 5G system has developed Advanced Coding Modulation (ACM) schemes such as hybrid FSK and QAM Modulation (FQAM) and Sliding Window Superposition Coding (SWSC), and advanced access technologies such as Filter Bank Multi Carrier (FBMC), Non-orthogonal Multiple Access (NOMA), and Sparse Code Multiple Access (SCMA).

To support transmission of downlink and uplink transmission channels in a wireless communication system, downlink control information (DCI) related thereto may be used. In conventional Long Term Evolution (LTE), DCI is transmitted on a physical downlink control channel (PDCCH), which is a separate physical channel for downlink control. The PDCCH is transmitted in at each subframe in the system band. A single PDCCH carries a single DCI message. A plurality of user equipments (UEs) may be simultaneously scheduled in the downlink and the uplink and thus, multiple PDCCHs are simultaneously transmitted in each cell. A cell-specific reference signal (CRS), which is a common reference signal in a cell, may be used for decoding a PDCCH. The CRS is an always-on signal that is transmitted in each subframe in the band, and scrambling and resource mapping for the CRS changes based on a cell identity (ID). All UEs that monitor PDCCHs may perform channel estimation using a CRS, and may decode PDCCHs. The CRS is transmitted to all of the UEs by using a broadcasting scheme, and thus, UE-specific beamforming cannot be used. Therefore, a multi-antenna transmission scheme for a PDCCH in LTE may be limited to open-loop transmission diversity.

Unlike the conventional system, a $5^{th}$ Generation (5G) wireless communication system will support services having a significantly short transmission delay and requiring high connection density, in addition to services that require high transmission speed. Therefore, a 5G communication system will provide various services using different transmission/reception schemes and having different transmission/reception parameters in a single system in order to satisfy various user requirements and services. The communication system should also be designed in consideration of forward compatibility, such that an added service is not restricted by the current system. For example, various services that use and, at the same time, support a scalable numerology for an inter-subcarrier interval, or have different transmission time intervals (TTIs) are serviced simultaneously in one system. Unlike the conventional LTE, time and frequency resources should be more flexibly utilized in 5G, e.g., to secure flexibility in designing a control channel.

A conventional PDCCH is unsatisfactory for securing flexibility, however, since the PDCCH is transmitted over the entire band and the size of a control region is set to be specific to a cell. Therefore, the 5G wireless communication system is being designed to include a control channel that is flexibly allocated according to various requirements of a service.

For example, in the frequency axis, a 5G downlink control channel is transmitted by setting a subband, as opposed to being transmitted over the entire band. In the time axis, the 5G downlink control channel is transmitted by setting the number of orthogonal frequency division multiplexing (OFDM) symbols, the sizes of which vary based on a TTI, a subframe length, a slot length, a mini-slot length, etc. From the perspective of a reference signal for decoding the 5G downlink control channel, a demodulation reference signal (DMRS) which may be transmitted only in a region where a downlink control channel is transmitted, may be used, as opposed to a conventionally used CRS that is transmitted over the entire band. Through the DMRS, forward compatibility and resource allocation flexibility may be secured.

The downlink control channel may have various formats. However, these different formats are not generally known in advance by a UE.

Also, the downlink control channel is transmitted using a resource from a set of time and frequency resources defined as a search space, and thus, the accurate time/frequency resources in which the downlink control channel is transmitted are not known in advance by the UE. Therefore, decoding of the downlink control channel by the UE is often based on blind decoding.

Blind decoding indicates an operation in which the UE performs downlink control channel decoding with respect to all possible downlink control channel formats and all possible combinations of time/frequency resources in a given search space. The downlink control channel may be transmitted at time intervals in which data scheduling and transmission is performed (e.g., a subframe interval, a slot interval, a mini-slot interval, etc.), and the UE may need to perform blind decoding. For example, for a PDCCH of an LTE system, a UE may perform blind decoding of a downlink control channel a maximum of 44 times for each component carrier. However, from the perspective of power consumption of the UE, this may be a big burden. Therefore, to reduce the power consumption of the UE attributable to blind decoding of a downlink control channel, there is a desire for a new scheme for monitoring a downlink control channel.

SUMMARY

The present disclosure is designed to address at least the problems and/or disadvantages described above and to provide at least the advantages described below.

Accordingly, an aspect of the present disclosure is to provide a method and an apparatus for transmitting and receiving information in a wireless communication system.

Another aspect of the present disclosure is to provide a method and an apparatus for monitoring a downlink control channel for reducing power consumption of a UE in a next generation wireless communication system.

Another aspect of the present disclosure is to provide a method and an apparatus for minimizing the number of times that blind decoding is performed by previously determining whether a downlink control channel is actually transmitted.

Another aspect of the present disclosure is to provide a method and an apparatus for previously determining whether a downlink control channel is actually transmitted using an additional sequence.

Another aspect of the present disclosure is to provide a method and an apparatus for previously determining whether a downlink control channel is actually transmitted using a reference signal sequence transmitted for decoding the downlink control channel.

In accordance with an aspect of the present disclosure, a method is provided for transmitting a downlink control channel in a wireless communication system. The method includes transmitting, on a first resource region, a detection signal indicating that a downlink control channel is transmitted; and transmitting a signal of the downlink control channel on a search space related to the first resource region.

In accordance with another aspect of the present disclosure, a method is provided for receiving a downlink control channel in a wireless communication system. The method includes determining whether a detection signal, which indicates that a downlink control channel is transmitted, is transmitted on a first resource region; and when the detection signal is determined as being transmitted on the first resource region, performing blind decoding of the downlink control channel on a search space related to the first resource region.

In accordance with another aspect of the present disclosure, an apparatus of a base station is provided, which transmits a downlink control channel in a wireless communication system. The apparatus includes a processor that generates a detection signal indicating that a downlink control channel is transmitted, and generates a signal of the downlink control channel; and a transceiver that transmits the detection signal on a first resource region, and transmits the signal of the downlink control channel on a search space related to the first resource region.

In accordance with another aspect of the present disclosure, an apparatus of a UE is provided, which receives a downlink control channel in a wireless communication system. The apparatus includes a transceiver that receives a signal on a radio channel; and a processor that determines whether a detection signal, which indicates that a downlink control channel is transmitted, is transmitted on a first resource region based on the received signal, and when the detection signal is determined as being transmitted on the first resource region, performs blind decoding of the downlink control channel on a received signal of a search space related to the first resource region.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
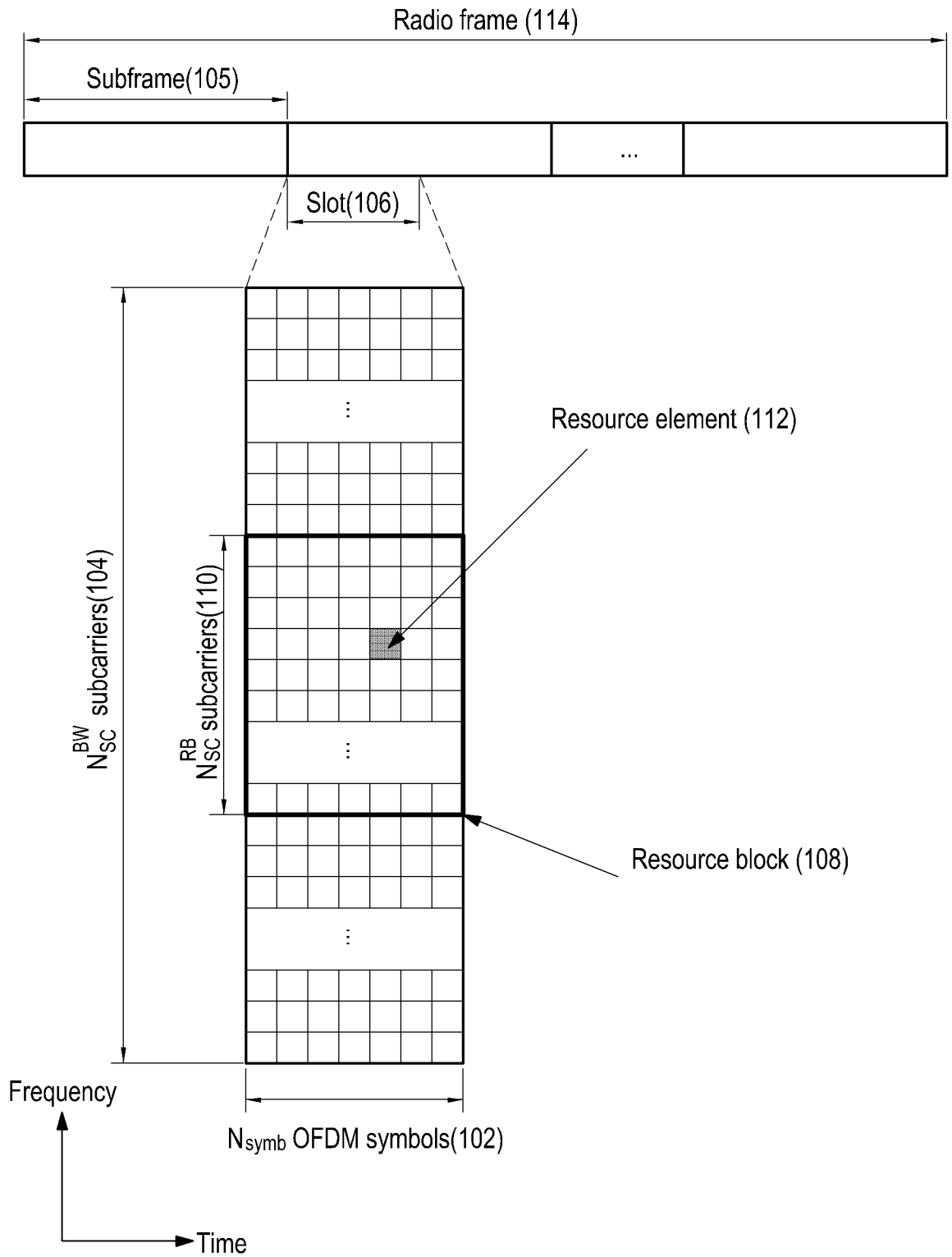
FIG. 1 illustrates a basic structure of a time-frequency domain corresponding to a radio resource region in which data or a control channel is transmitted in a downlink of an LTE system.

Hereinafter, various embodiments of the present disclosure will be described in detail with reference to the accompanying drawings.

In describing the various embodiments of the present disclosure, the descriptions of technical details that are well known in the art to which the present disclosure pertains and not directly associated with the present disclosure will be omitted in order to prevent the present disclosure from being obscured by unnecessary detail.

Similarly, in the accompanying drawings, some elements may be exaggerated, omitted, or schematically illustrated. The size of each element does not necessarily reflect the actual size. In the drawings, identical or corresponding elements may be with identical reference numerals.

Each block of the flowchart illustrations, and combinations of blocks in the flowchart illustrations, can be implemented by computer program instructions. The computer program instructions can be provided to a processor of a general purpose computer, special purpose computer, or other programmable data processing apparatus to produce a machine, such that the instructions, which execute via the processor of the computer or other programmable data processing apparatus, implement the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instructions that implement the function specified in the flowchart block or blocks. The computer program instructions may also be loaded onto a computer or other programmable data processing apparatus to cause a series of operational steps to be performed on the computer or other programmable apparatus to produce a computer implemented process, such that the instructions that execute on the computer or other programmable apparatus provide steps for implementing the functions specified in the flowchart block or blocks.

Each block of the flowchart illustrations may represent a module, segment, or portion of code, which includes one or more executable instructions for implementing the specified logical function(s). In some alternative implementations, the functions noted in the blocks may occur in a different order. For example, two blocks illustrated in succession may in fact be executed substantially concurrently or the blocks may sometimes be executed in the reverse order, depending upon the functionality involved.

Herein, the term "unit" may indicate a software or hardware component, such as a field-programmable gate array (FPGA) or an application specific integrated circuit (ASIC), and a "unit" performs any function. However, a "unit" or "module" is not limited to software or hardware. A "unit" or "module" may be constructed either to be stored in an addressable storage medium or to execute one or more processors. Therefore, a "unit" or "module" may include, e.g., software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by a "unit" or "module" may be either combined into a smaller number of elements, "units", or "modules" or divided into a larger number of elements, "units", or "modules". The elements, "units" and/or "modules" may be implemented to reproduce one or more central processing units (CPUs) within a device or a security multimedia card.

Although embodiments of the present disclosure are described below with reference to an OFDM-based wireless communication system, the present disclosure is also applicable to other communication systems and services having similar technical backgrounds.

FIG. 1 illustrates a basic structure of a time-frequency domain corresponding to a radio resource region in which data or a control channel is transmitted in a downlink of an LTE system.

Referring to FIG. 1, the horizontal axis indicates the time domain, and the vertical axis indicates the frequency domain. In the time domain, the minimum transmission unit is an OFDM symbol. One slot 106 includes $N_{symb}$ OFDM symbols 102, and one subframe 105 includes two slots. The length of one slot is 0.5 ms, and the length of one subframe is 1.0 ms. A radio frame 114 is a time domain unit including 10 subframes.

In the frequency domain, the minimum transmission unit is a subcarrier, and the overall transmission bandwidth (a system bandwidth) includes a total of $N_{sc}^{BW}$ subcarriers 104.

In the time-frequency domain, the basic resource unit is a resource element (RE) 112, and an RE is expressed by an OFDM symbol index and a subcarrier index.

A resource block (RB) (or a physical resource block (PRB)) 108 is defined by consecutive $N_{symb}$ OFDM symbols 102 in the time domain and consecutive $N_{sc}^{RB}$ subcarriers 110 in the frequency domain. Therefore, one PRB 108 includes $N_{symb} \times N_{sc}^{RB}$ REs 112.

A PRB pair indicates a unit of two consecutive PRBs in the time domain, which includes $N_{symb} \times 2 \times N_{sc}^{RB}$ REs 112. Generally, the minimum transmission unit for data is a PRB. In an LTE system, generally, $N_{symb}=7$ and $N_{RB}=12$. $N_{sc}^{BW}$ and $N_{sc}^{RB}$ are proportional to the bandwidth of a system transmission band.

Subsequently, DCI in the LTE and LTE-Advanced (LTE-A) system will be described in detail.

In the LTE system, scheduling information for downlink data or uplink data is transferred from an eNB to a UE through DCI. The DCI may be defined in various formats.

DCI is used by applying a DCI format determined based on whether the DCI is scheduling information for uplink data or scheduling information for downlink data, whether the DCI is compact DCI including small-size control information, whether spatial multiplexing using a multi-antenna is applied, whether the DCI is for power control, etc. For example, DCI format 1, which is scheduling control information for downlink data, may be configured to include:

resource allocation type 0/1 flag: indicating whether a resource allocation type is type 0 or type 1. Type 0 applies a bitmap scheme, and allocates resources in units of resource block groups (RBGs). In the LTE system, a basic unit of scheduling is an RB expressed by time and frequency domain resources, and an RBG includes a plurality of RBs and is used as the basic unit of scheduling in the type 0 scheme. Type 1 allows allocation of an RB in an RBG.

resource block assignment: indicating an RB allocated to data transmission. A resource to be expressed is determined based on a system bandwidth and a resource allocation scheme.

modulation and coding scheme (MCS): indicating a modulation scheme used for data transmission and the size of a transport block which is data to be transmitted.

hybrid automatic request (HARQ) process number: indicating the process number of a HARQ.

new data indicator: indicating whether transmission is HARQ initial transmission or retransmission.

redundancy version: indicating the redundancy version of HARQ transmit power control (TPC) command for physical uplink control channel (PUCCH) indicating a TPC command for a PUCCH which is an uplink control channel.

The DCI is transmitted through a PDCCH or an enhanced PDCCH (EPDCCH) after a channel coding and modulation process.

A cyclic redundancy check (CRC) is attached to a payload of a DCI message, and the CRC is scrambled by a radio network temporary identifier (RNTI) corresponding to a UE ID. Based on the purpose of the DCI message, e.g., UE-specific data transmission, power control command, random access response, etc., different RNTIs are used. That is, an RNTI is not transmitted explicitly, but is transmitted by being included in a CRC calculation process. When a UE receives a DCI message transmitted on a PDCCH, the UE identifies a CRC using an allocated RNTI, and determines that the DCI message is transmitted to the UE when the CRC is identified.

Figure 2:
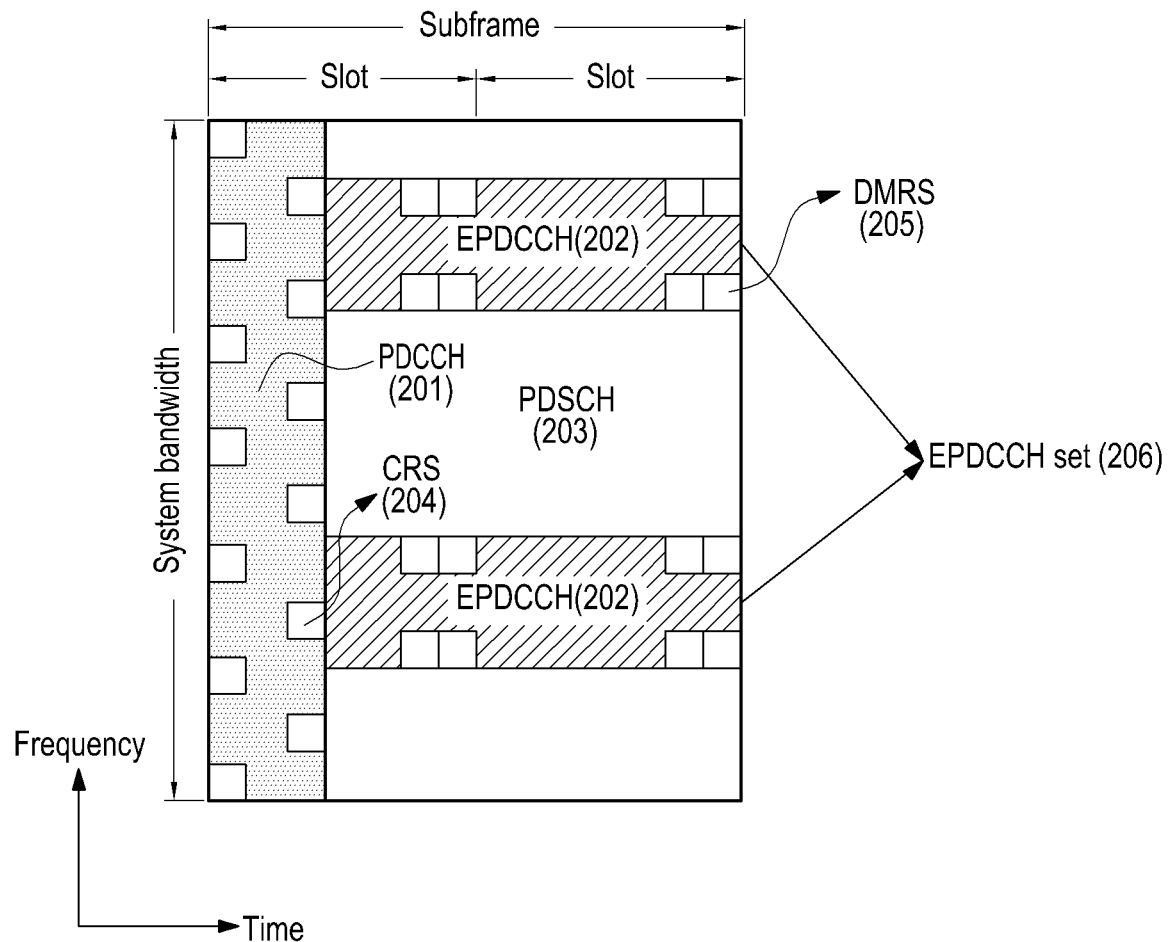
FIG. 2 illustrates a transmission of downlink control channels in an LTE system.

FIG. 2 illustrates a transmission of a PDCCH and an EPDCCH, which are physical downlink channels, in an LTE system.

Referring to FIG. 2, a PDCCH 201 is time-multiplexed with a physical downlink shared channel (PDSCH) 203, which is a data transmission channel, and is transmitted in the entirety of a system bandwidth. The region of the PDCCH 201 is expressed by the number of OFDM symbols, and is indicated to a UE through a control format indicator (CFI) transmitted through a physical control format indicator channel (PCFICH). By allocating the PDCCH 201 to OFDM symbols located in the forepart of a subframe, the UE may immediately decode downlink scheduling allocation, whereby a delay of decoding a downlink shared channel (DL-SCH), i.e., an overall downlink transmission delay, may be reduced.

A single PDCCH carries a single DCI message. A plurality of UEs may be simultaneously scheduled in the downlink and the uplink, and thus, multiple PDCCHs may be simultaneously transmitted in each cell.

A CRS 204 is used as a reference signal for decoding the PDCCH 201. The CRS 204 is transmitted in each subframe of the entire band, and scrambling and resource mapping is changed based on a cell ID. The CRS 204 is used by all UEs in common, and thus, UE-specific beamforming may not be used. Therefore, a multi-antenna transmission scheme for a PDCCH of LTE may be limited to open-loop transmission diversity. The number of ports of a CRS is implicitly known to a UE through decoding of a physical broadcast channel (PBCH).

The resource allocation for the PDCCH 201 is based on a control-channel element (CCE), and one CCE includes 9 resource element groups (REGs), i.e., a total of 36 REs. The number of CCEs required for a PDCCH 201 may be 1, 2, 4, or 8, based on the channel coding rate of a DCI message payload. As described above, the different values of the number of CCEs may be used for implementing a link adaptation of the PDCCH 201.

A UE must detect a signal of the PDCCH 201 while not knowing of the information on the PDCCH 201. LTE defines a search space indicating an aggregation of CCEs for blind decoding. The search space includes a plurality of aggregations based on aggregation levels (ALs) of CCEs, and the AL is not explicitly signaled but is defined implicitly through a subframe number and a function by a UE identity. In each subframe, a UE performs decoding of the PDCCH 201 with respect to all possible resources candidates, which are made from the CCEs in the set search space, and processes information that has been indicated to the UE as valid information through identifying CRC.

The search space is classified into a UE-specific search space and a common search space. UEs in a UE group or all UEs may check a common search space for the PDCCH 201 in order to receive cell-specific control information, such as dynamic scheduling associated with system information or a paging message. For example, scheduling allocation information of a DL-SCH for transmission of a system information block (SIB)-1 including cell operator information or the like may be transmitted through the common search space for the PDCCH 201. In addition, UE-specific DCI, such as scheduling information for uplink data and scheduling information for downlink data, may be transmitted through the UE-specific search space.

According to FIG. 2, the EPDCCH 202 may be frequency-multiplexed with the PDSCH 203, and may be transmitted. An eNB appropriately allocates resources of the EPDCCH 202 and the PDSCH 203 through scheduling, in order to support the coexistence with the data transmission for a legacy LTE UE. However, the EPDCCH 202 is transmitted by being allocated to the entirety of one subframe in the time axis, whereby there may be a loss from the perspective of a transmission delay. One EPDCCH set 206 includes a plurality of EPDCCHs 202, and the allocation of the EPDCCH set 206 may be performed based on a PRB pair unit. The location information on the EPDCCH set 206 may be UE-specifically set, and signaled through radio resource control (RRC). A maximum of two EPDCCH sets may be set for each UE, and one EPDCCH set 206 may be multiplexed and simultaneously set for different UEs.

The resource allocation for the EPDCCH 202 is based on an enhanced CCE (ECCE), and one ECCE includes 4 or 8 enhanced REGs (EREGs), and the number of EREGs per ECCE may vary based on the length of a cyclic prefix and a subframe configuration. One EREG includes 9 REs, whereby 16 EREGs may be included in each PRB pair.

An EPDCCH transmission scheme is classified into a localized transmission scheme and a distributed transmission scheme based on an RE mapping scheme of an EREG. The aggregation level of the ECCE may be 1, 2, 4, 8, 16, or 32, based on the length of a CP, a subframe configuration, an EPDCCH format, and a transmission scheme. The EPDCCH 202 supports only a UE-specific search space. Therefore, a UE that desires to receive a system message must search a common search space of the existing PDCCH 201.

The transmission scheme of the EPDCCH 202 includes a localized scheme and a distributed scheme. In the localized transmission scheme, all EREGs included in an ECCE exist in the same PRB pair. Conversely, in the distributed transmission scheme, EREGs included in an ECCE may exist in different PRB pairs in a plurality of PRB pairs configured for the EPDCCH transmission. In the localized transmission scheme, UE-specific beamforming may be used. In the distributed transmission scheme, a precoder cycling-based diversity scheme may be used.

The EPDCCH 202 uses a DMRS 205 for decoding. Therefore, a precoding for the EPDCCH 202 may be set by an eNB, and UE-specific beamforming may be used. UEs may not know which precoding is used, but may perform decoding of the EPDCCH 202 through the DMRS 205. The EPDCCH 202 may use the same pattern as that of a DMRS of the PDSCH 203. However, unlike the PDSCH 203, the DMRS 205 for the EPDCCH 202 may support transmission using a maximum of four antenna ports. The DMRS 205 is transmitted in only a corresponding PRB in which an EPDCCH is transmitted.

Port configuration information of the DMRS 205 is changed based on a transmission scheme of the EPDCCH. In the localized transmission scheme, an antenna port corresponding to an ECCE to which the EPDCCH 202 is mapped is randomly selected based on the ID of a UE. When different UEs share the same ECCE, i.e., when multiuser multi-input multi-output (MU-MIMO) transmission is used, a DMRS antenna port may be allocated to each of the UEs.

Alternatively, a plurality of UEs may share the DMRS 205. In this instance, each UE may identify the DMRS 205 using a DMRS scrambling sequence set by higher layer signaling.

In the distributed transmission scheme, a maximum of two antenna ports of the DMRS 205 may be supported, and the DMRS 205 may be shared by all REs transmitted in a single PRB pair.

Figure 3:
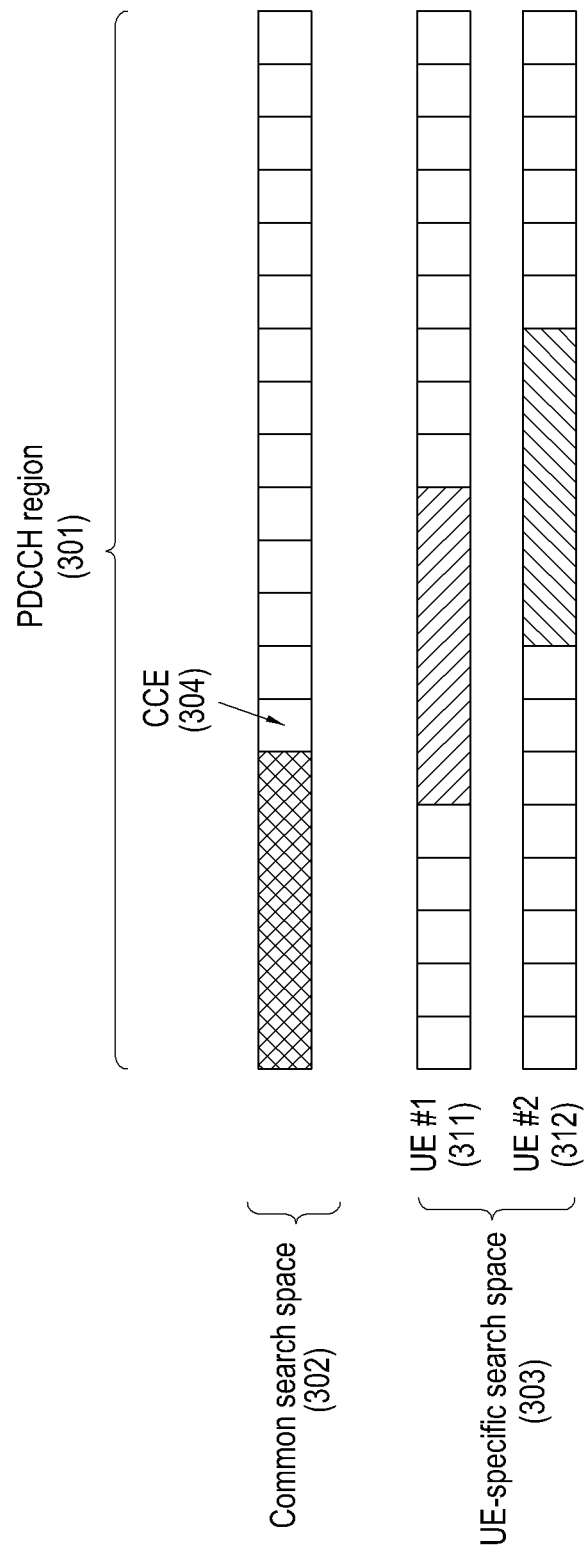
FIG. 3 illustrates a search space in which a downlink control channel is allocable in an LTE system.

FIG. 3 illustrates a search space to which a PDCCH is allocable in an LTE system.

Referring to FIG. 3, an entire PDCCH region 301 includes an aggregation of CCEs 304 in a logical region, and includes a search space including the aggregation of CCEs 304. The search space is separated into a common search space 302 and a UE-specific search space 303. FIG. 3 illustrates an example of two UE-specific search spaces 311 and 312 for UE #1 311 and UE #2 312.

A search space for an LTE PDCCH may be defined as follows.

A set of PDCCH candidates to monitor are defined in terms of search spaces, where a search space $S_k^{(L)}$ at aggregation level $L \in \{1, 2, 4, 8\}$ is defined by a set of PDCCH candidates. For each serving cell on which PDCCH is monitored, the CCEs corresponding to PDCCH candidate m of the search space $S_k^{(L)}$ are given by Equation (1).

$$L\{(Y_k+m')\bmod \lfloor N_{CCE,k}/L \rfloor\}+i \quad (1)$$

In Equation (1), $Y_k$ is defined below, i=0, ..., L−1. For the common search space, m'=m. For the PDCCH UE specific search space, for the serving cell on which PDCCH is monitored, if the monitoring UE is configured with carrier indicator field then m'=m+$M^{(L)} \cdot n_{CI}$ where $n_{CI}$ is the carrier indicator field value. However, if the monitoring UE is not configured with carrier indicator field then m'=m, where m=0, ..., $M^{(L)}$−1. $M^{(L)}$ is the number of PDCCH candidates to monitor in the given search space.

The carrier indicator field value is the same as ServCellIndex.

For the common search spaces, $Y_k$ is set to 0 for the two aggregation levels L=4 and L=8.

For the UE-specific search space $S_k^{(L)}$ at aggregation level L, the variable $Y_k$ is defined as shown in Equation (2).

$$Y_k = (A \cdot Y_{k-1}) \bmod D \quad (2)$$

In Equation (2), $Y_{-1} = n_{RNTI} \neq 0$, A=39827, D=65537 and k=$\lfloor n_s/2 \rfloor$ $n_s$ is the slot number within a radio frame.

According to a search space for a PDCCH, as described above, the UE-specific search space 303 is not explicitly signaled, and may be defined implicitly through a subframe number and a function by a UE identity and an RNTI. That is, a UE-specific search space may vary based on a subframe number, i.e., over time, thereby solving a problem in that a predetermined UE has difficulty in using a search space due to other UEs.

Although all CCEs 304 that a UE monitors are already used by other UEs scheduled in the same subframe, and the UE is not scheduled in the subframe, this problem may not occur in a subsequent subframe. For example, according to FIG. 3, although the UE-specific search spaces of UE #1 311 and UE #2 312 partially overlap, the UE-specific search spaces vary over subframes. Accordingly, it is expected that overlapping in a subsequent subframe may be different from the current subframe.

According to the definition of the search space for the PDCCH, UEs in a UE group or all UEs must receive a PDCCH in the common search space 302, where the search space is defined as an aggregation of previously agreed CCEs 304. That is, the common search space 302 does not change based on a UE ID, a subframe number, etc. The common search space 302 exists for transmission of various system messages, but may be used for transmitting control information of an individual UE. Based on the foregoing, the common search space 302 may be used when a UE is not scheduled since the amount of resources available in the UE-specific search space 303 is insufficient.

A search space is a set of candidate control channels including CCEs 304 to which a UE must attempt to decode at a given aggregation level, and various aggregation levels may be defined for forming one aggregation using 1, 2, 4, or 8 CCEs 304. Accordingly, the UE may have a plurality of search spaces.

For an LTE PDCCH, the number of PDCCH candidates that a UE must monitor in a search space defined based on an aggregation level is defined as shown in Table 1 provided below.

TABLE 1

| | Search space $S_k^{(L)}$ | | Number of PDCCH |
|---|---|---|---|
| Type | Aggregation level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

According to Table 1, the UE-specific search space 303 supports aggregation levels {1, 2, 4, 8}, and the number of PDCCH candidates of the respective levels are {6, 6, 2, 2}. The common search space 302 supports aggregation levels {4, 8}, and the number of PDCCH candidates of respective cases are {4, 2}. The common search space 302 only needs to support the aggregation levels {4, 8} in order to have good coverage characteristic since a system message generally needs to arrive at a cell edge.

DCI transmitted in the common search space 302 is defined for a DCI format, such as 0/1A/3/3A/1C, which corresponds to a purpose of power control of a UE group or a system message The common search space 302 does not support a DCI format having spatial multiplexing. In the UE-specific search space 303, a downlink DCI format that is to be decoded is changed based on a transmission mode (TM) configured for a UE. The transmission mode is configured through RRC signaling, and thus, an accurate subframe number where the configuration is effective for a UE is not designated. Therefore, the UE always performs decoding with respect to DCI format 1A, irrespective of a transmission mode, so as not to lose communication.

In the above descriptions, the structure and the transmission scheme of a downlink control channel in conventional LTE and LTE-A systems have been described. In the following description below, a new radio physical downlink control channel (NR-PDCCH) is provided, which is a downlink control channel for a 5G wireless communication system.

Figure 4:
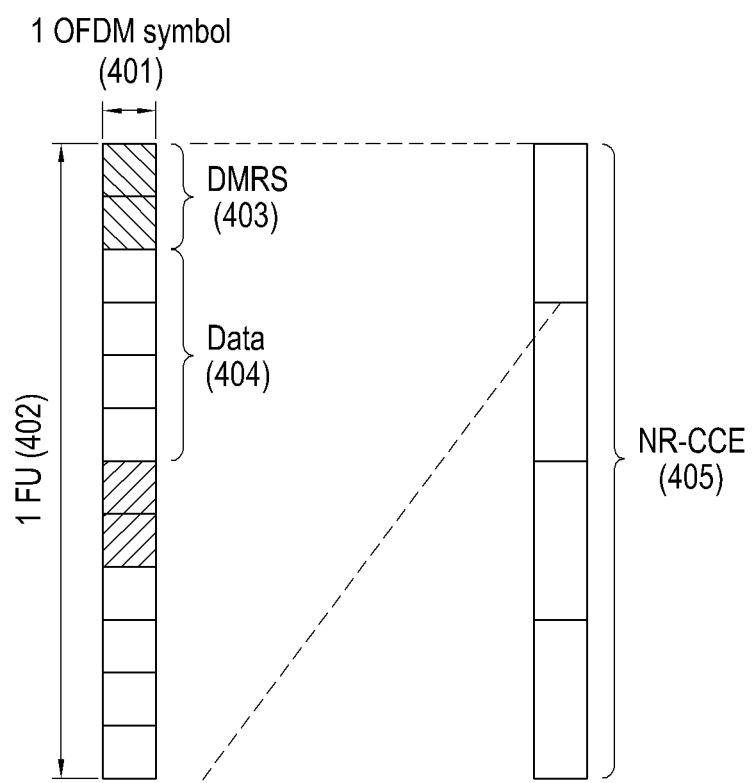
FIG. 4 illustrates an example of time-and-frequency resources forming a 5G downlink control channel according to an embodiment of the present disclosure.

FIG. 4 illustrates an example of time-and-frequency resources forming a 5G downlink control channel according to an embodiment of the present disclosure.

Referring to FIG. 4, a basic unit of time-and-frequency resources forming an NR-PDCCH, which is a 5G downlink control channel, is referred to as a resource element group (NR-REG) (or physical resource block (PRB)). The NR-REG includes 1 OFDM symbol 401 in the time axis, and 1 frequency unit (FU) 402 in the frequency axis. The 1 FU 402 is defined as the basic unit of a frequency resource that an eNB performs scheduling for a UE. For example, when scheduling is performed using 12 subcarriers or one PRB as a basic unit in the frequency domain, the 1 FU 402 may be defined to have a size corresponding to 12 subcarriers (i.e., 12 REs).

By setting 1 OFDM symbol 401 as a basic unit in the time axis in the process of configuring the basic unit of a control channel, a data channel and a control channel may be time-multiplexed in one subframe. By locating the control channel before the data channel in the frequency axis, a user's processing time may be reduced, whereby a latency requirement may be easily satisfied. By setting the 1 FU 402 as a basic unit in the frequency axis of the control channel, frequency multiplexing between the control channel and the data channel may be efficiently performed. When the basic unit of the frequency axis includes subcarriers smaller than the 1 FU 402, a start point for scheduled data in the frequency axis should be indicated based on a subcarrier unit.

A control channel region may be configured in various sizes by concatenating the NR-PDCCH's basic units illustrated in FIG. 4. For example, when a basic unit for the allocation of a 5G downlink control channel is an NR-CCE 405, 1 NR-CCE 405 may be configured based on the basic unit (e.g., a PRB) of the 5G downlink control channel. According to the example illustrated in FIG. 4, when 1 NR-CCE 405 includes 4 PRBs, the 1 NR-CCE 405 may include 48 REs.

A control channel region may include a plurality of NR-CCEs 405, and a downlink control channel may be mapped to one or multiple NR-CCEs 405 based on an aggregation level in the control channel region, and may be transmitted. The NR-CCEs 405 in the control channel region may be identified by numbers, and the numbers may be assigned according to a logical mapping scheme. An actual physical resource for the NR-CCE 405 may be mapped in units of PRBs. Block interleaving and a cell-specific cyclic shift (CS) may be additionally used in order to strengthen the downlink control channel.

The transmission scheme of an NR-PDCCH includes a localized scheme and a distributed scheme. In the localized transmission scheme, one NR-CCE 405 includes a plurality of PRBs contiguous in the frequency axis. Conversely, in the distributed transmission scheme, one NR-CCE 405 includes a plurality of PRBs that are non-contiguous in the frequency axis. The localized scheme and the distributed scheme may use different transmission schemes. For example, UE-specific beamforming may be used in the localized scheme. A diversity transmission scheme, such as precoder cycling, may be used in the distributed scheme.

The basic unit of the NR-PDCCH of FIG. 4 may include both a data region 404 to which DCI is mapped and a region where a DMRS 403 used for decoding the DCI is mapped. The DMRS 403 of the NR-PDCCH of FIG. 4 may be configured as a common/shared RS or a UE-specific/PDCCH-specific RS based on a transmission mode of the NR-PDCCH. For example, when the transmission scheme of an NR-PDCCH is set to the localized scheme, and UE-specific beamforming is used, the DMRS 403 in a resource in which the NR-PDCCH is transmitted may be configured as a UE-specific RS for a corresponding UE.

As another example, when the transmission scheme of an NR-PDCCH is set to the distributed scheme, and a transmission diversity transmission scheme is used, the DMRS 403 in a resource to which multiple NR-PDCCHs transmitted to different UEs are allocated may be configured as a common RS that a plurality of UEs may commonly use. The DMRS 403 may be effectively transmitted by taking into consideration overhead associated with RS allocation or the like. For example, the transmission of the DMRS 403 may be turned on/off based on a downlink control channel allocation scheme or an antenna port configuration used by an eNB. That is, the DMRS 403 may or may not be transmitted in a PRB. An RE in which the transmission of the DMRS 403 is turned off, may be used for transmitting DCI.

An RS sequence used as the DMRS 403 of the NR-PDCCH may be defined, e.g., as shown in Equation (3).

$$r(m) = \frac{1}{\sqrt{2}}(1 - 2 \cdot c(2m)) + j\frac{1}{\sqrt{2}}(1 - 2 \cdot c(2m+1)) \tag{3}$$

In Equation (3), r(m) denotes a signal modulated by quadrature phase shift keying (QPSK), c(m) denotes a binary pseudo-random sequence, and m denotes an index. An initial sequence used for generating the pseudo-random sequence c may be defined as shown in Equation (4).

$$C_{init} = (\lfloor n_s/2 \rfloor + 1) \cdot (2n_{ID}^{NR\text{-}PDCCH} + 1) \cdot 2^{16} + b \tag{4}$$

In Equation (4), $n_{ID}^{NR\text{-}PDCCH}$ is a previously defined unique ID. For example, a cell ID or a UE ID (e.g., an RNTI) may be used, or a value set through higher layer signaling (e.g., RRC signaling) for each UE may be used. The transmitted DMRS 403 may be configured as a common/shared RS or a UE-specific/PDCCH-specific RS according to a transmission mode of an NR-PDCCH. Accordingly, the value of $n_{ID}^{NR\text{-}PDCCH}$ may be set to be different for each case.

For example, when the DMRS 403 is a common/shared RS, all UEs that desire to use the DMRS 403 should be assigned with an agreed sequence, and thus, $n_{ID}^{NR\text{-}PDCCH}$ may be set as a common ID. For example, a cell ID may be used as $n_{ID}^{NR\text{-}PDCCH}$.

As another example, when the DMRS 403 is a UE-specific/PDCCH-specific RS, the DMRS 403 should be effective for a specific UE, and thus, $n_{ID}^{NR\text{-}PDCCH}$ may be set as a UE-specific ID. For example, a UE ID may be used as $n_{ID}^{NR\text{-}PDCCH}$.

Alternatively, a value of $n_{ID}^{NR\text{-}PDCCH}$ may be allocated through RRC signaling to be appropriate for an RS configuration (e.g., whether it is a common/shared RS or a UE-specific/PDCCH-specific RS).

Figure 5:
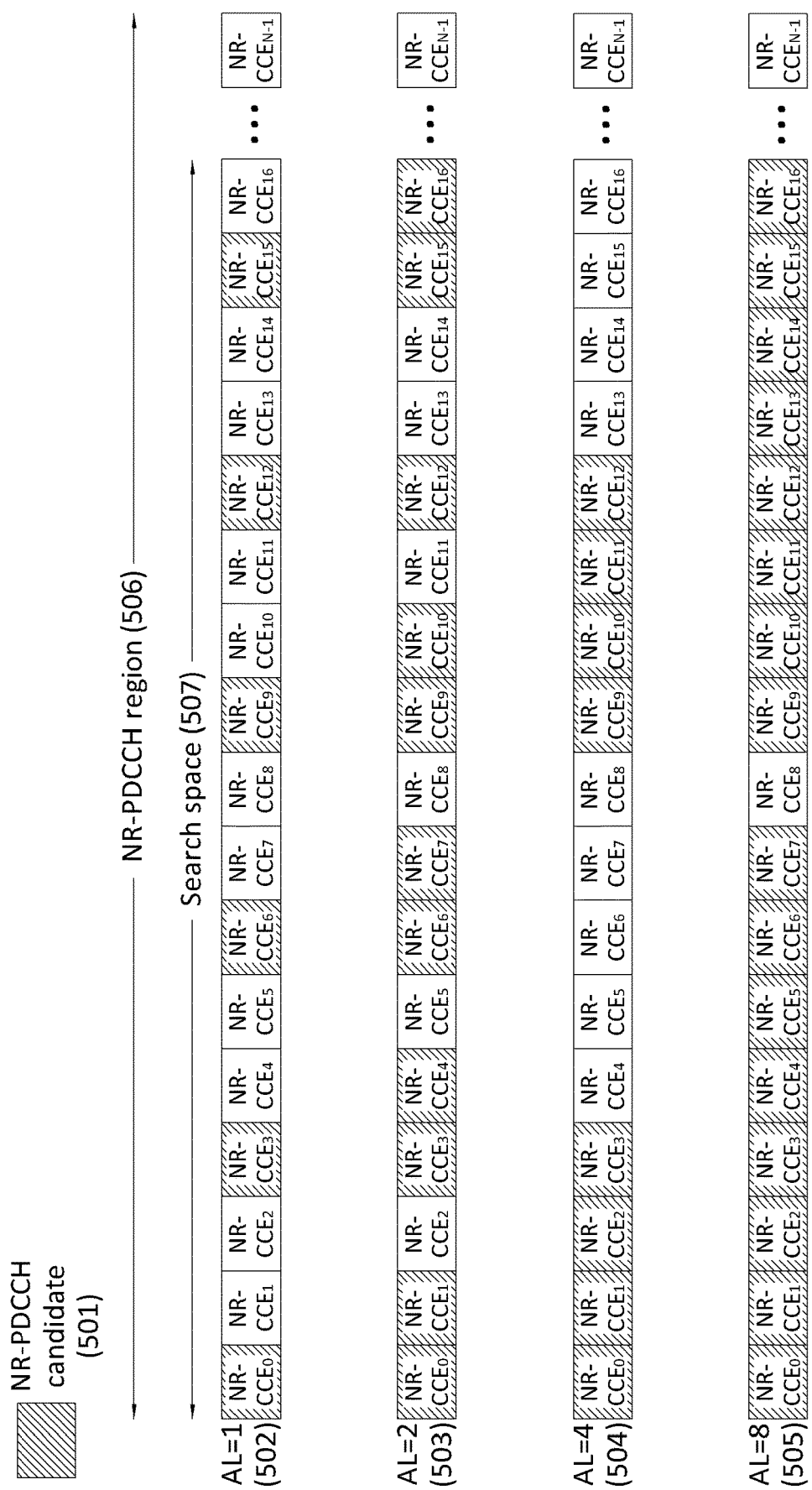
FIG. 5 illustrates an example of a search space for a 5G downlink control channel according to an embodiment of the present disclosure.

FIG. 5 illustrates an example of a search space for a 5G downlink control channel according to an embodiment of the present disclosure.

Referring to FIG. 5, an NR-PDCCH region 506 includes a total of N NR-CCEs, i.e., $NR\text{-}CCE_0$, $NR\text{-}CCE_1$, $NR\text{-}CCE_2$, ..., and $NR\text{-}CCE_{N-1}$. The NR-PDCCH region 506 is expressed as an aggregation of NR-CCEs, and the configuration of the NR-CCEs is based on logical mapping.

Actual physical mapping of the NR-PDCCH region 506 is determined by time and frequency resources (e.g., the number of OFDM symbols and a subband) configured as an NR-PDCCH. Various schemes for mapping physical time/frequency resources and NR-CCEs may exist. Generally, one or more basic resource units (e.g., NR-REGs or PRBs) of an NR-PDCCH may be used as described above.

A search space for an NR-PDCCH may be expressed as a set of NR-PDCCH candidates 501 that a UE should search, and different search spaces may exist based on an aggregation level. Search spaces at AL 1 502, AL 2 503, AL 4 504, and AL 8 505 are respectively illustrated. For example, the search space at the AL 1 502 includes a total of 6 NR-PDCCH candidates {NR-CCE$_0$}, {NR-CCE$_3$}, {NR-CCE$_6$}, {NR-CCE$_9$}, {NR-CCE$_{12}$}, and {NR-CCE$_{15}$}.

Similarly, the search space at the AL 2 503 includes a total of 6 NR-PDCCH candidates {NR-CCE$_0$, NR-CCE$_1$}, {NR-CCE$_3$, NR-CCE$_4$}, {NR-CCE$_6$, NR-CCE$_7$}, {NR-CCE$_9$, NR-CCE$_{10}$}, {NR-CCE$_{12}$, NR-CCE$_{13}$}, and {NR-CCE$_{15}$, NR-CCE$_{16}$}, the search space at the AL 4 504 includes a total of 2 NR-PDCCH candidates {NR-CCE$_0$, NR-CCE$_1$, NR-CCE$_2$, NR-CCE$_3$} and {NR-CCE$_9$, NR-CCE$_{10}$, NR-CCE$_{11}$, NR-CCE$_{12}$}, and the search space at the AL 8 505 includes a total of 2 NR-PDCCH candidates {NR-CCE$_0$, NR-CCE$_1$, . . . , NR-CCE$_7$} and {NR-CCE$_9$, NR-CCE$_{10}$, . . . , NR-CCE$_{12}$}. Here, { } indicates an aggregation of NR-CCEs to which one NR-PDCCH is mapped at an aggregation level.

Search spaces at all aggregation levels in the example of FIG. 5 exist over a total of 17 NR-CCEs, i.e., NR-CCE$_0$, NR-CCE$_1$, . . . , NR-CCE$_{16}$, and are defined as the entire search space 507. Each search space 507 may be a common search space or a UE-specific search space. That is, FIG. 5 illustrates an example of a search space, without distinguishing a common search space and a UE-specific search space.

In a 5G system, a slot, a mini-slot, etc., may be defined as a scheduling unit, a transmission unit, or a TTI for a downlink data channel. For example, a slot may be defined by 7 or 14 OFDM symbols. A mini-slot may be defined by at least one OFDM symbol. Accordingly, in a 5G system, a downlink control channel may be transmitted based on each slot/or mini-slot or based on multiple slots/mini-slots, and a UE continuously monitors a downlink control channel to detect control information.

Particularly, for a service that requires a significantly low latency, monitoring a downlink control channel may be a big burden from the perspective of power consumption of a UE.

When monitoring a downlink control channel, the UE determines whether its DCI exists through blind decoding. In this instance, most of power is consumed by a channel decoding operation (e.g., decoding operation for convolutional coding) in the blind decoding. Therefore, in order to reduce the power consumed when the UE performs blind decoding of a downlink control channel, in accordance with an embodiment of the present disclosure, a search space where blind decoding is to be performed is limited, before channel decoding is performed.

The embodiments described below provide a downlink control channel monitoring scheme to reduce power consumption of a UE in a next generation wireless communication system. According to the scheme of monitoring a downlink control channel, provided in the following embodiments, a UE previously determines whether its downlink control channel is actually transmitted using an additional sequence or a DMRS sequence transmitted for downlink control channel decoding, whereby the number of times that blind decoding is unnecessarily performed may be minimized. Accordingly, blind decoding is only performed within a portion of the search space, thereby reducing the number of times that blind decoding is performed and minimizing the power consumption of the UE.

Figure 6:
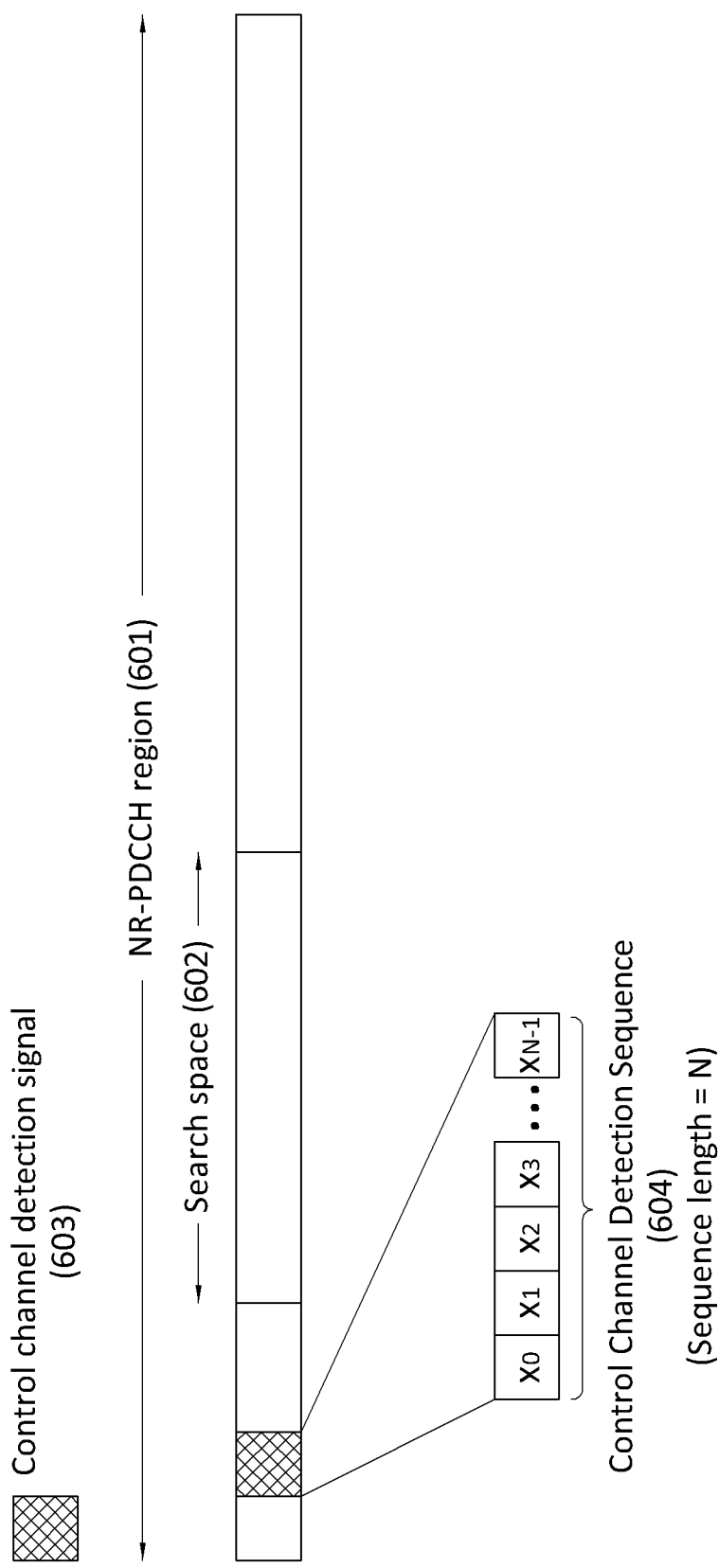
FIG. 6 illustrates a downlink control channel transmission according to an embodiment of the present disclosure.

FIG. 6 illustrates a downlink control channel transmission according to an embodiment of the present disclosure.

Referring to FIG. 6, an NR-PDCCH region 601 includes a search space 602 in. The search space 602 may be a common search space or a UE-specific search space. A control channel detection signal 603 is additionally transmitted in the NR-PDCCH region 601. The control channel detection signal 603 includes a control channel detection sequence 604, which has a length of N and may be expressed as $\{x_0, x_1, \ldots, x_{N-1}\}$. The control channel detection signal 603 may be used to determine whether an NR-PDCCH is actually transmitted before a UE performs blind decoding of an NR-PDCCH. Also, the control channel detection sequence 604 may be defined as a sequence used as the control channel detection signal 603.

A transmission scheme of the control channel detection signal 603 may be different based on various system parameters and configurations. For example, the control channel detection signal 603 may be a broadcast signal transmitted to all UEs in common. In this instance, the control channel detection signal 603 may be transmitted through a previously agreed time/frequency resource or transmitted in one location of a common search space. Accordingly, a plurality of UEs may identify the same control channel detection signal 603.

As another example, the control channel detection signal 603 may be a unicast signal that is UE-specifically transmitted. In this instance, the control channel detection signal 603 may be transmitted through a previously UE-specific agreed time/frequency resource or transmitted in one location of a UE-specific search space. Accordingly, a specific UE may identify the control channel detection signal 603.

The control channel detection signal 603 may be transmitted through a resource location, other than the search space 602, or may be transmitted through a resource location within the search space 602.

The control channel detection sequence 604 may include a Zadoff-Chu sequence, a pseudo random sequence (like Equation (3)), etc. The control channel detection sequence 604 may be configured to be different based on various system parameters and configurations.

The control channel detection sequence 604 may be configured to be the same for a plurality of UEs in a cell. In this instance, the control channel detection sequence 604 may be generated based on a cell ID.

When a Zadoff-Chu sequence is used as the control channel detection sequence 604, a root sequence may be selected as the control channel detection sequence 604 based on a cell ID, or cyclic shift may be applied to the root sequence.

When a pseudo random sequence is used as the control channel detection sequence 604, an initial sequence may be determined as the control channel detection sequence 604 based on a cell ID, or a scrambling sequence may be determined as the control channel detection sequence 604.

As another example, the control channel detection sequence 604 may be configured as a UE-specific sequence. In this instance, the control channel detection sequence 604 may be generated based on a UE ID (e.g., RNTI).

When a Zadoff-Chu sequence is used as the control channel detection sequence 604, a root sequence may be selected as the control channel detection sequence 604 based on a UE ID, or cyclic shift may be applied to the root sequence.

When a pseudo random sequence is used as the control channel detection sequence 604, an initial sequence may be determined as the control channel detection sequence 604 based on a UE ID, or a scrambling sequence may be determined as the control channel detection sequence 604.

An eNB may additionally transmit the control channel detection signal 603 including the control channel detection sequence 604, in the NR-PDCCH region 601 in which an NR-PDCCH is transmitted. In this instance, a previously agreed sequence between the NB and the UE is used as the control channel detection sequence 604. The UE attempts to detect the control channel detection signal 603 before performing blind decoding of an NR-PDCCH, and when the transmission of the control channel detection signal 603 is identified, the UE starts blind decoding of an NR-PDCCH. When the control channel detection signal 603 is not identified, the UE assumes that an NR-PDCCH has not been transmitted, and does not perform blind decoding.

Figure 7:
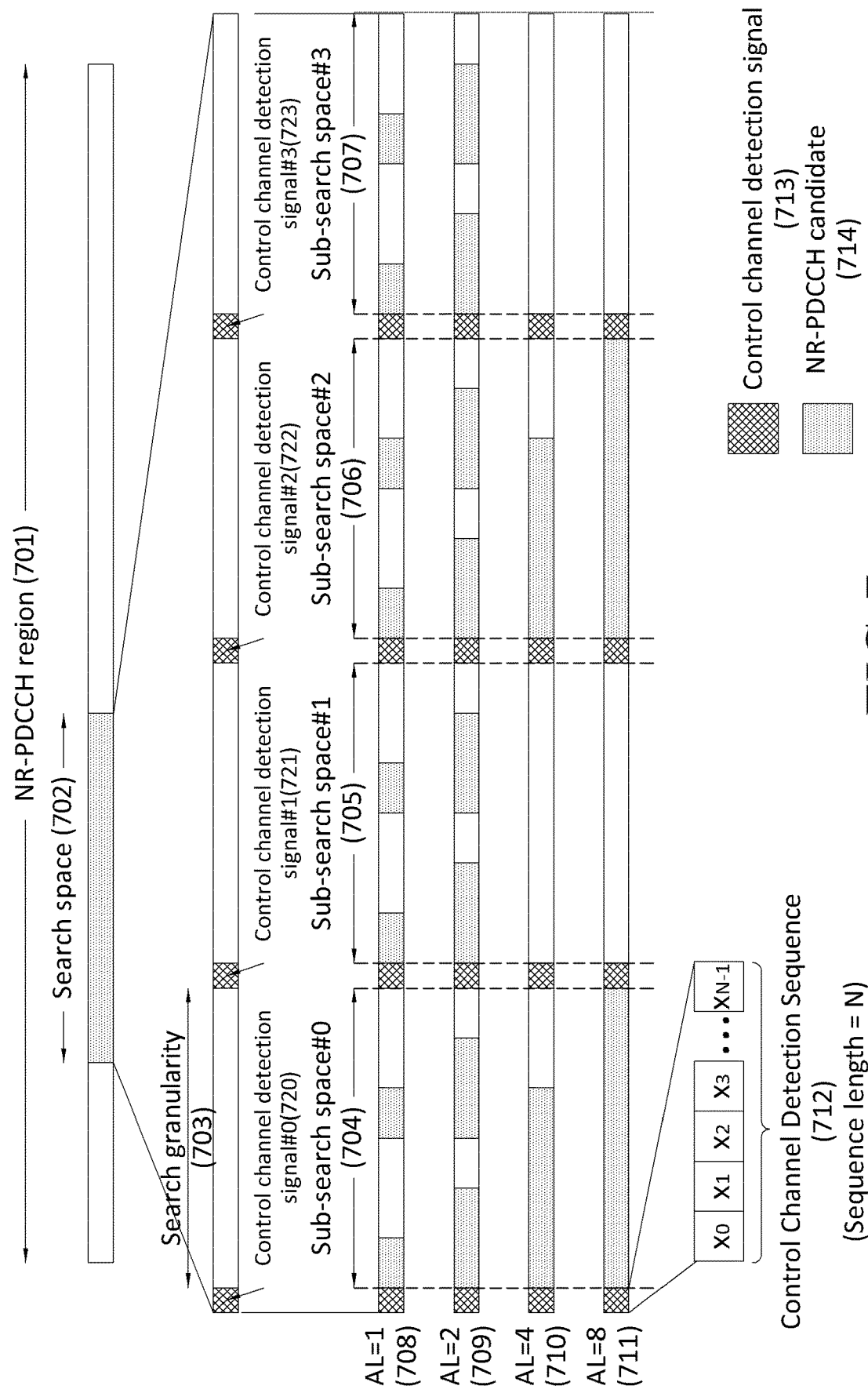
FIG. 7 illustrates a downlink control channel transmission according to an embodiment of the present disclosure.

FIG. 7 illustrates a downlink control channel transmission according to an embodiment of the present disclosure.

Referring to FIG. 7, an NR-PDCCH region 701 includes a search space 702, which may be a common search space or a UE-specific search space. In FIG. 7, search spaces at respective ALs 708, 709, 710, and 711 in the search space 702 are illustrated. As described above, a search space at each aggregation level is expressed as a set of NR-PDCCH candidates 714. The search space 702 is illustrated in units of search granularities 703. The search space 702 is divided into a plurality of areas, sub-search space #0 704, sub-search space #1 705, sub-search space #2 706, and sub-search space #3 707, based on the size of the search granularity 703.

An aggregation level for blind decoding may be changed based on a sub-search space 704, 705, 706, and 707. For example, when blind decoding is performed in the sub-search space #0 704, a UE may search NR-PDCCH candidates 714 at AL 1 708, AL 2 709, AL 4 710, and AL 8 711. As another example, when blind decoding is performed in the sub-search space #1 705, a UE may search NR-PDCCH candidates 714 at only AL 1 708 and AL 2 709.

A plurality of control channel detection signals 713 may be transmitted in the NR-PDCCH region 701. Here, an example of transmitting a total of four control channel detection signals 720, 721, 722, and 723 is illustrated. The control channel detection signals 720, 721, 722, and 723 may be broadcast signals transmitted to all UEs in common. In this instance, each control channel detection signal 720, 721, 722, and 723 may be transmitted through a previously agreed time/frequency resource or transmitted in one location of a common search space. Accordingly, a plurality of UEs may identify the same control channel detection signals 720, 721, 722, and 723.

Alternatively, the control channel detection signals 720, 721, 722, and 723 may be unicast signals that are UE-specifically transmitted. In this instance, the control channel detection signal 720, 721, 722, and 723 may be transmitted through a previously UE-specific agreed time/frequency resource or transmitted in one location of a UE-specific search space. Accordingly, a UE may detect and identify at least one of the control channel detection signals 720, 721, 722, and 723.

In FIG. 7, the control channel detection signals 720, 721, 722, and 723 are transmitted in the search space 702. In addition, the control channel detection signals 720, 721, 722, and 723 may be transmitted through predetermined resource locations other than the sub-search spaces 704, 705, 706, and 707.

As another example, the control channel detection signals 720, 721, 722, and 723 may be transmitted through predetermined resource locations in the sub-search spaces 704, 705, 706, and 707, respectively.

Each of the control channel detection signals 720, 721, 722, and 723 may be generated from a control channel detection sequence 712. The control channel detection sequence 712 having a length of N may be expressed as $\{x_0, x_1, \ldots, x_{N-1}\}$. The control channel detection sequence 712 may include a Zadoff-Chu sequence, a pseudo random sequence, or the like. The control channel detection sequence 712 may be configured to be different based on various system parameters and configurations.

In a similar manner as the embodiment of FIG. 6, the control channel detection sequence 712 may be configured as a common sequence or a UE-specific sequence. A plurality of control channel detection sequences corresponding to a plurality of control channel detection signals 720, 721, 722, and 723 may be defined. In this instance, the control channel detection signals 720, 721, 722, and 723 may use different control channel detection sequences, or may use the same control channel detection sequence.

An eNB may additionally transmit at least one control channel detection signal 713 including the control channel detection sequence 712 in an NR-PDCCH region 701 in which an NR-PDCCH is transmitted. In this stance, only a corresponding control channel detection signal from among the control channel detection signals 720, 721, 722, and 723 may be transmitted based on a sub-search space 704, 705, 706, or 707 to which an NR-PDCCH is allocated in the entire search space 702.

For example, the control channel detection signal #0 720 may correspond to the sub-search space #0 704, the control channel detection signal #1 721 may correspond to the sub-search space #1 705, the control channel detection signal #2 722 may correspond to the sub-search space #2 706, and the control channel detection signal #3 723 may correspond to the sub-search space #3 707, respectively. When the eNB transmits an NR-PDCCH in the sub-search space #0 704, the eNB may transmit the control channel detection signal #0 720. Similarly, when the eNB transmits an NR-PDCCH in the sub-search space #1 705, the eNB may transmit the control channel detection signal #1 721. A UE may attempt to detect at least one of the four control channel detection signals 720, 721, 722, and 723, which are agreed in advance, before performing blind decoding of an NR-PDCCH. When the transmission of the control channel detection signal #0 720 is identified, the UE may perform blind decoding of an NR-PDCCH with respect to only the sub-search space #0 704.

The entire search space 702 is divided into a plurality of sub-search spaces 704, 705, 706, and 707 based on the search granularity 703. The UE may determine whether to perform blind decoding with respect to respective sub-search spaces 704, 705, 706, and 707 by detecting control channel detection signals 720, 721, 722, and 723 respectively corresponding to the sub-search spaces 704, 705, 706, and 707.

The control channel detection signals 720, 721, 722, and 723 respectively corresponding to the sub-search spaces 704, 705, 706, and 707 may be transmitted in various schemes.

In FIG. 7, the control channel detection signals 720, 721, 722, and 723 respectively corresponding to the sub-search spaces 704, 705, 706, and 707 may be transmitted through different resource locations. A control channel detection signal 720, 721, 722, or 723 transmitted in a resource region may correspond to a sub-search space 704, 705, 706, or 707.

As another example, the eNB may match different control channel detection signals to sub-search spaces 704, 705, 706, and 707 by transmitting different control channel detection signals on the same resource. Particularly, the control channel detection signals corresponding to the sub-search spaces 704, 705, 706, and 707 may be distinguished by different control channel detection sequences. In this instance, based on the sub-search spaces 704, 705, 706, and 707 that the control channel detection signals correspond to, the control channel detection signals may include different sequences, e.g., different Zadoff-Chu sequences (e.g., different root sequences or sequences distinguished by cyclic shift) or different pseudo random sequences (different initial sequences or sequences distinguished by scrambling).

Figure 8:
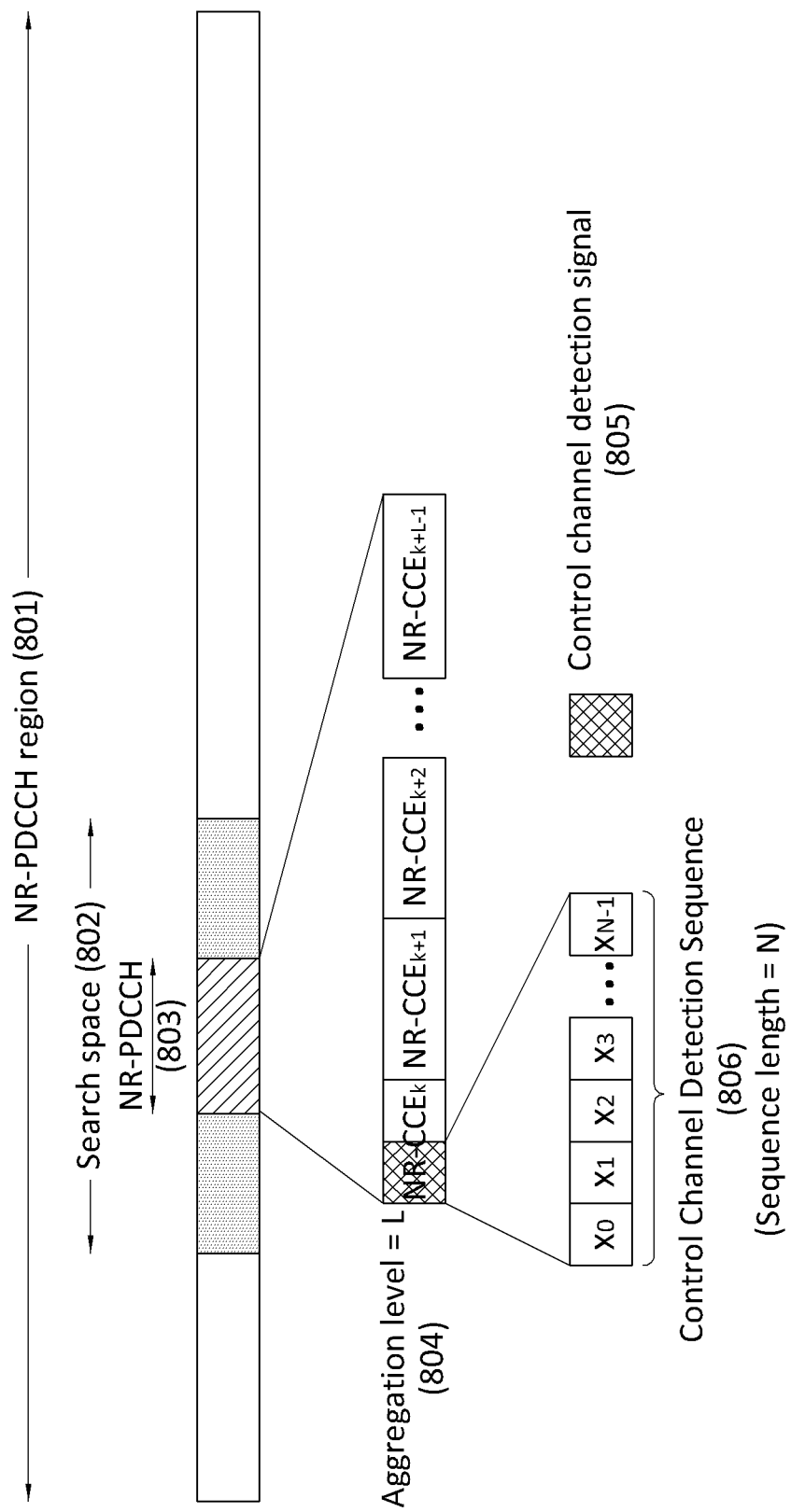
FIG. 8 illustrates a downlink control channel transmission according to an embodiment of the present disclosure.

FIG. 8 illustrates a downlink control channel transmission according to an embodiment of the present disclosure.

Referring to FIG. 8, an NR-PDCCH region 801 includes a search space 802, which may be a common search space or a UE-specific search space. An NR-PDCCH 803 may be transmitted by being mapped to a resource region in the search space 802. Also, the NR-PDCCH 803 may be transmitted, including an aggregation level L 804.

The NR-PDCCH 803 includes L NR-CCEs, i.e., {NR-CCE$_k$, NR-CCE$_{k+1}$, ..., NR-CCE$_{k+L-1}$}, according to the aggregation level L 804.

A control channel detection signal 805 may be additionally transmitted in the NR-PDCCH region 801. The control channel detection signal 805 may include a control channel detection sequence 806, e.g., a sequence {$x_0, x_1, ..., x_{N-1}$} having a length of N.

The control channel detection signal 805 may be transmitted by occupying a part of a resource region to which the NR-PDCCH 803 is mapped. In this instance, the location of the resource region to which the control channel detection signal 805 is mapped may be previously agreed between an eNB and a UE.

The control channel detection sequence 806 may include a Zadoff-Chu sequence, a pseudo random sequence, etc. The control channel detection sequence 806 may be configured to be different based on various system parameters and configurations. Similar to the embodiment of FIG. 6, the control channel detection sequence 806 may be configured as a common sequence or a UE-specific sequence.

An eNB may additionally transmit the control channel detection signal 805 including the control channel detection sequence 806 in the resource region in which the NR-PDCCH 803 is allocated. In this instance, the eNB may allocate the NR-PDCCH 803 to an available resource by taking into consideration the location of a resource used for transmitting the control channel detection signal 805.

The UE attempts to detect the control channel detection signal 805 from the previously agreed resource location in the search space 802 (i.e., NR-PDCCH candidates for respective aggregation levels), before performing blind decoding of an NR-PDCCH. When the transmission of the control channel detection signal 805 is identified, the UE may perform blind decoding with respect to only a corresponding NR-PDCCH candidate (or candidates). In FIG. 8, the UE may attempt to detect the control channel detection signal 805 from a first NR-CCE from among a plurality of NR-CCEs included in the NR-PDCCH 803 in the search space 802, in order to determine whether the NR-PDCCH 803 is transmitted.

In FIGS. 6-8, the length (N) of a control channel detection sequence may be a fixed value or may be variously set in consideration of various system parameters. When the length of the control channel detection sequence is long, the UE is capable of more accurately determining whether the control channel detection signal exists. However, as the length of the control channel detection sequence is longer, the amount of resources required to transmit a control channel detection signal increases, whereby overhead increases, which is a drawback.

Conversely, as the length of the control channel detection sequence is shorter, it becomes difficult to determine the existence of a control channel detection signal. However, overhead attributable to the transmission of the control channel detection signal may be reduced. Therefore, in accordance with an embodiment of the present disclosure, an appropriate length of the control channel detection sequence is determined.

According to an embodiment, the length of a control channel detection sequence may be variously set based on an aggregation level. As described above, the eNB may achieve a link adaptation for an NR-PDCCH by controlling an aggregation level. For example, the eNB may transmit an NR-PDCCH having a high aggregation level to a UE in a cell boundary region where a received signal strength is weak.

Conversely, the eNB may transmit an NR-PDCCH having a low aggregation level to a UE having a high received signal strength. In this instance, a long control channel detection sequence may be configured for a high aggregation level, and a short control channel detection sequence may be configured for a low aggregation level.

A high aggregation level may be used to indicate that the quality of a received signal of a corresponding UE is poor. Accordingly, the performance of detecting a control signal detection signal deteriorates, and thus, it is preferable to use a long control channel detection sequence.

In addition, from the perspective of overhead, the amount of resources used for transmitting an NR-PDCCH at high aggregation level is large, and thus, the amount of overhead generated by sending a control channel detection signal may be relatively small (i.e., the amount of resources used for transmitting a control channel detection signal compared to the amount of resources used for transmitting an NR-PDCCH). Therefore, the eNB sets the length of a control channel detection sequence based on an aggregation level, whereby a UE's detection performance and resource efficiency may be improved.

Figure 9:
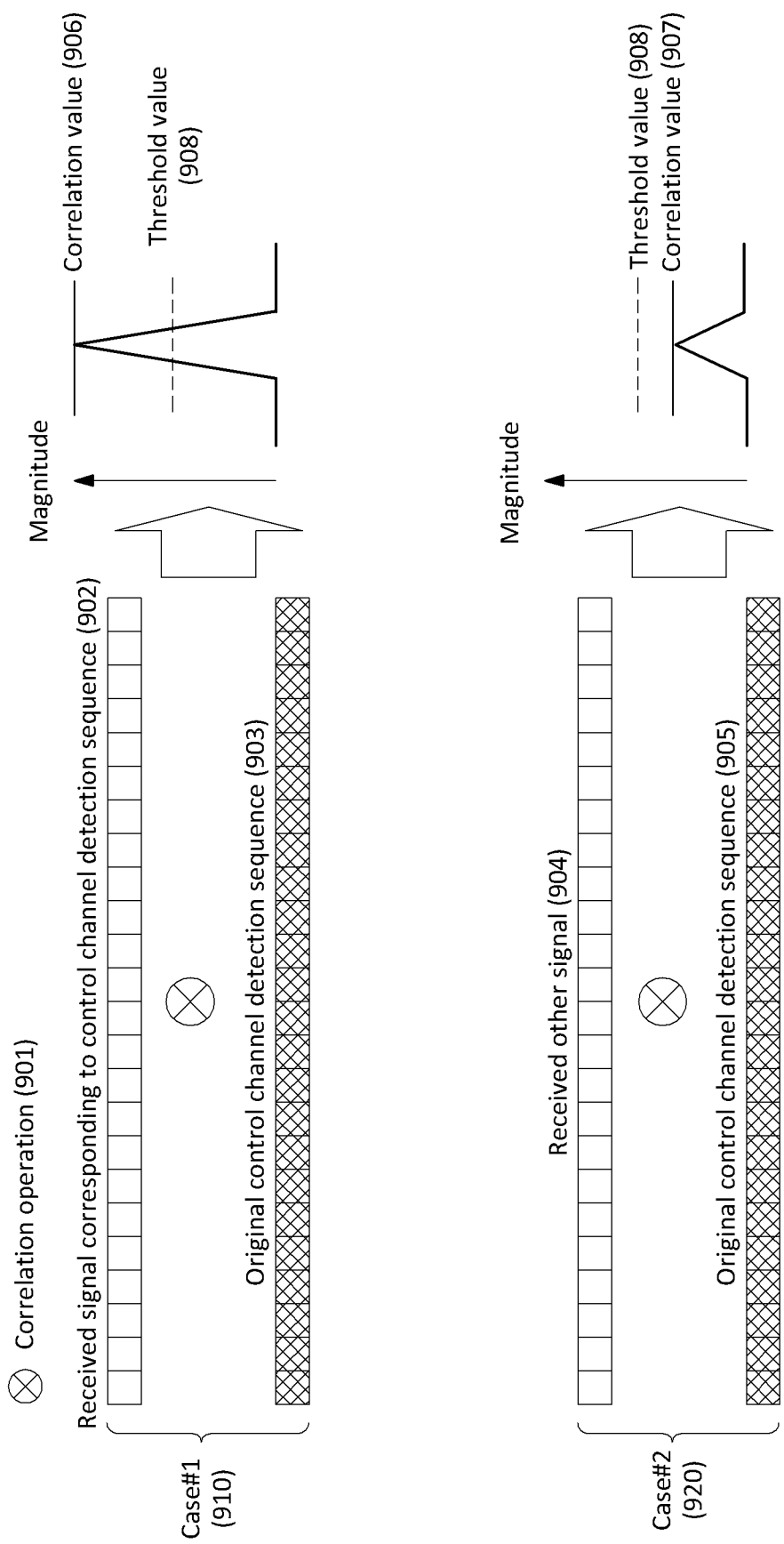
FIG. 9 illustrates detection of a control channel detection signal according to an embodiment of the present disclosure.

FIG. 9 illustrates detection of a control channel detection signal according to an embodiment of the present disclosure.

Referring to FIG. 9, a correlation operation 901 may be used to detect a control channel detection signal. An example of a correlation operation 901 with respect to two complex number sequences $y_k$ and $r_k$ having a length of N, may be defined by Equation (5) as provided below.

$$\text{Correlation value} = \alpha \times \Sigma_{m=0}^{N-1} |y_k(m) \times \text{conj}(r_k(m))| \qquad (5)$$

In Equation (5), conj(x) denotes a conjugate complex number for x, and |x| denotes the absolute value of x. $\alpha$ denotes a constant for normalization.

As another example, the correlation operation 901 for two binary sequences having a length of N, $y_k$ and $r_k$, may be defined by Equation (6), as provided below.

$$\text{Correlation value} = \beta \times \Sigma_{m=0}^{N-1} (y_k(m) + r_k(m)) \bmod 2 \qquad (6)$$

In Equation (6), (x)mod 2 denotes a modulo-2 operation for x.

The two examples of the above described correlation operation 901 may be applied to be different based on types of sequences to which the correlation operation 901 is to be performed. For example, a correlation operation as defined in Equation (5) may be performed with respect to a Zadoff-Chu sequence, which is a complex number sequence. A correlation operation as defined in Equation (6) may be performed with respect to a pseudo random sequence, which is a binary sequence.

The UE may determine whether a control channel detection signal exists through the defined correlation operation 901. When a correlation value between a received signal and a predetermined control channel detection signal is higher than a predetermined threshold value, the UE assumes that a control channel detection signal has been transmitted.

FIG. 9 illustrates case #1 910, in which an eNB transmits a predetermined control channel detection signal 903 and a UE receives the same, and case #2 920, in which an eNB transmits a signal which is irrelevant to a predetermined control channel detection signal 905, and a UE receives the same.

In case #1 910, in which the eNB transmits the predetermined control channel detection signal 903, the UE performs the correlation operation 901 with respect to a received signal 902 and the previously known control channel detection signal 903. The received signal 902 shows high correlation with the control channel detection signal 903, and thus, a high correlation value 906 may be obtained as a result of the correlation operation 901. The correlation value 906 may be higher than a predetermined threshold value 908, whereby the UE may assume that the control channel detection signal 903 has been transmitted.

In case #2 920, in which the eNB transmits a signal irrelevant to the predetermined control channel detection signal 905, the UE performs the correlation operation 901 with respect to a received signal 904 and the previously known control channel detection signal 905. The received signal 904 shows low correlation with the existing control channel detection signal 905, and thus, a low correlation value 907 may be obtained as a result of the correlation operation 901. The correlation value 907 may be lower than the predetermined threshold value 908, whereby the UE may assume that the control channel detection signal 905 has not been transmitted.

As described above, the UE may detect a control channel detection signal, and may determine whether to perform blind decoding of an NR-PDCCH based on the result of the detection.

The magnitude of the threshold value 908 used for detecting a control channel detection signal may affect a UE operation and decoding performance. That is, based on the magnitude of the threshold value 908, trade-off may exist between successful NR-PDCCH decoding and UE's power consumption. Particularly, when the magnitude of the threshold value 908 is small, a probability that a correlation value 906 or 907 calculated through the correlation operation 901 is higher than the threshold value 908 is high. Accordingly, the UE may perform blind decoding a larger number of times.

When the magnitude of the threshold value 908 is low, a probability of performing blind decoding with respect to the entire search space is higher than a probability of performing blind deciding with respect to a partial resource region. Accordingly, a probability of successful NR-PDCCH decoding is high. However, the power consumption of the UE may increase since the number of times that blind decoding is performed is increased.

Conversely, when the magnitude of the threshold value 908 is high, a probability that the correlation value 906 or 907 calculated through the correlation operation 901 is higher than the threshold value 908 is low. A probability that a UE performs blind decoding with respect to a partial resource region, as opposed to the entire search space, is high. Accordingly, the number of times that blind decoding is performed is decreased and the power consumption of the UE may be reduced. However, blind decoding is performed with respect to only a partial search space, and thus, a probability of successful NR-PDCCH decoding is low.

A threshold value required for determining the existence of a control channel detection signal may be calculated based on at least one of various system parameters, e.g., a radio link quality, the electric energy of a UE, the amount of traffic, and a latency.

The threshold value may be variously controlled based on a channel state (or a received signal quality) between an eNB and a UE. The channel state may include at least one of a reference signal received power (RSRP), a reference signal received quality (RSRQ), and channel quality information (CQI). The UE may measure the channel state using various RSs, e.g., a measurement reference signal (MRS), a beam reference signal (BRS), a channel state information reference signal (CSI-RS), etc. The channel state being good indicates that the distortion of a received signal compared to a transmitted signal is low. Therefore, when the channel state is good, a more accurate correlation value may be obtained through a correlation operation for a control channel detection signal.

When the correlation value is accurate, whether the control channel detection signal exists may be accurately determined even though a relatively large threshold value is used. Accordingly, when the channel state is good, it is effective from the perspective of a UE operation and power consumption to perform blind decoding with respect to only a partial resource region using a high threshold value. Conversely, when the channel state is poor, a relatively low threshold value is used to increase a probability of successfully decoding NR-PDCCH.

The UE may select one threshold value to be used for detecting a control channel detection signal based on the system parameters, from among predetermined threshold values or threshold values given by the eNB. Alternatively, the eNB may indicate a threshold value to be used for detecting a control channel detection signal to the UE, based on the system parameters.

A threshold value used for detecting a control channel detection signal may be controlled based on the battery state of the UE. The battery state of the UE may be at least one of the amount of charge remaining in the battery, the amount of heat of the battery, and the amount of charge in the battery, and may include all states associated with the battery.

Although embodiments of the present disclosure are described using the amount of charge remaining in the battery as the battery state, the present disclosure may be equivalently applied to other battery states.

When the amount of charge remaining in the battery of a UE is small, a power-efficient UE operation for monitoring an NR-PDCCH is preferable. Therefore, when the amount of charge remaining in the battery of the UE is small, it is efficient to perform blind decoding with respect to a minimum resource region. Accordingly, it this scenario, it is preferable to use a relatively high threshold value.

Conversely, when the amount of charge remaining in the battery of the UE is high, it is preferable to successfully decode an NR-PDCCH. Accordingly, it this scenario, it is preferable to use a relatively low threshold value.

The UE may select one threshold value to be used for detecting a control channel detection signal based on the battery state, from among predetermined threshold values or threshold values given by the eNB. Alternatively, the UE may control, based on a battery state of the UE, a threshold value that is autonomously determined by the UE or given by the eNB.

The magnitude of a threshold value may be a previously agreed value or may be variously set based on a system parameter. The UE may arbitrarily set and use a threshold value, or the eNB may indicate a predetermined value to the UE such that the UE uses the predetermined value as a threshold value.

When the eNB indicates a threshold value setting to the UE, the threshold value may be statically or semi-statically set through RRC signaling or may be dynamically set through DCI.

The threshold value setting may act as an indicator for turning on/off a low-power downlink control channel monitoring operation. For example, when the threshold value is set to 0, the UE may maintain an existing operation, i.e., the UE may perform blind decoding with respect to the entire set search space, which may be understood as a low-power downlink control channel monitoring operation being turned off.

Figure 10:
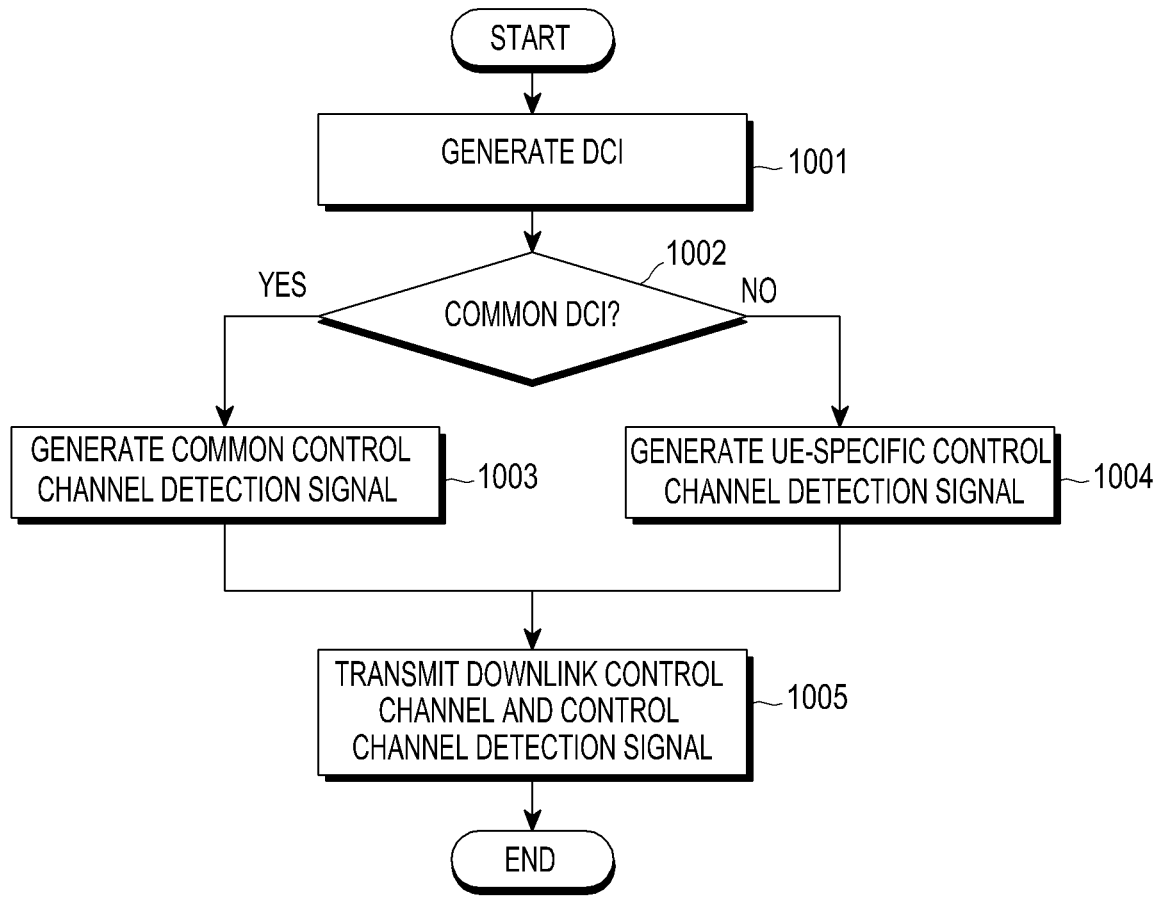
FIG. 10 is a flowchart illustrating a method of transmitting a downlink control channel and a control channel detection signal by an eNode B (eNB) according to an embodiment of the present disclosure.

FIG. 10 is a flowchart illustrating a method of transmitting a downlink control channel and a control channel detection signal by an eNB according to an embodiment of the present disclosure.

Referring to FIG. 10, the eNB generates DCI in step 1001.

In step 1002, the eNB determines whether the generated DCI is common DCI, which is broadcasted to a plurality of UEs, or UE-specific DCI, which is unicasted to a specific UE.

When it is determined that the DCI is common DCI, the eNB generates a common control channel detection signal in step 1003. However, when it is determined that the DCI is UE-specific DCI, the eNB generates a UE-specific control channel detection signal in step 1004.

In step 1005, the eNB transmits a downlink control channel (e.g., an NR-PDCCH) and the generated control channel detection signal to the UE through a corresponding resource region (that is a corresponding search space).

Figure 11:
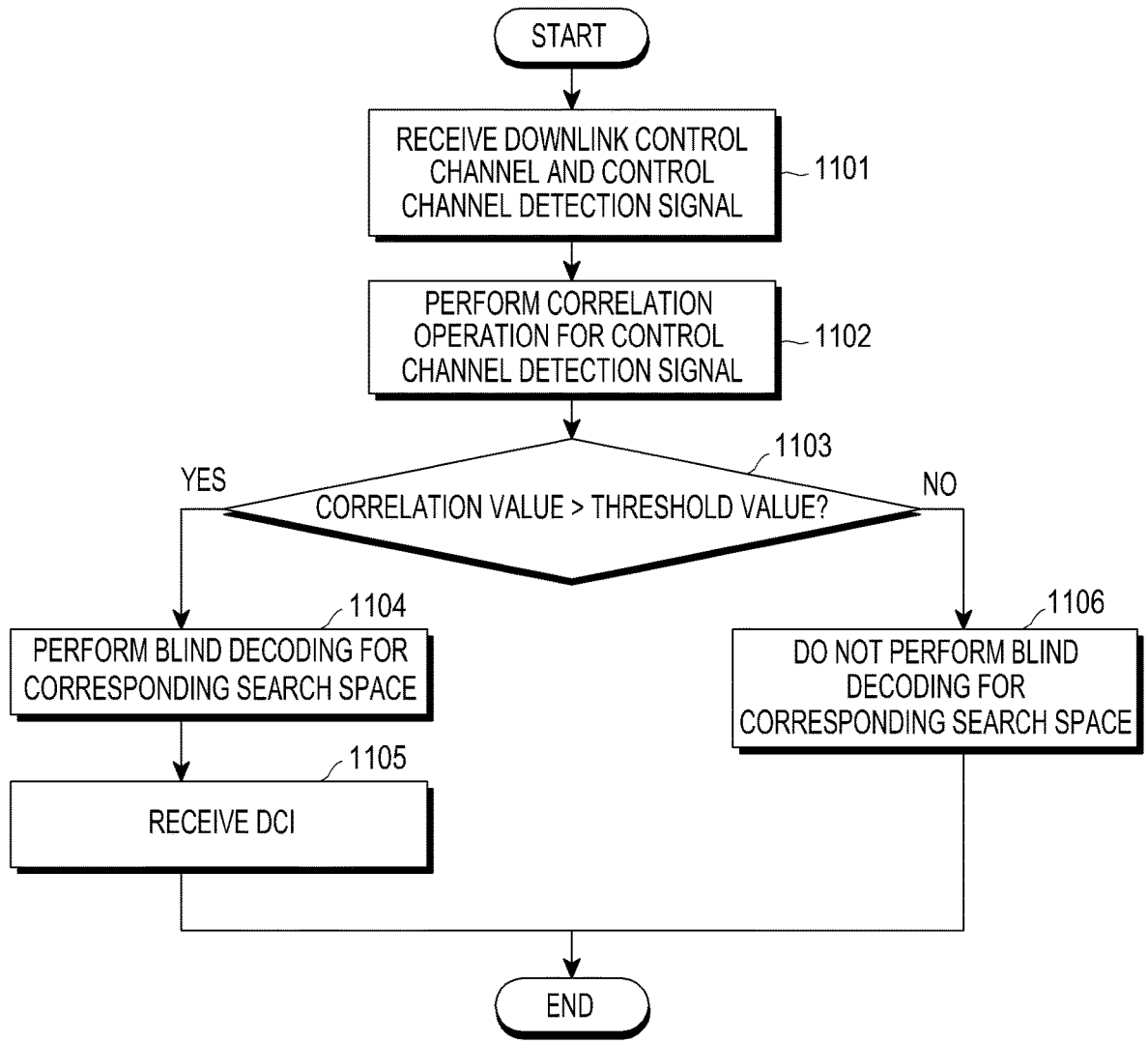
FIG. 11 is a flowchart illustrating a method of receiving a downlink control channel and a control channel detection signal by a UE according to an embodiment of the present disclosure.

FIG. 11 is a flowchart illustrating a method of receiving a downlink control channel and a control channel detection signal by a UE according to an embodiment of the present disclosure.

Referring to FIG. 11, in step 1101, a UE receives a signal of a resource region to which a downlink control channel (e.g., an NR-PDCCH) and a control channel detection signal are mapped.

In step 1102, the UE performs a correlation operation for the received signal and a previously known control channel detection signal.

In step 1103, the UE determines whether the control channel detection signal exists based on the result of the correlation operation.

When a correlation value obtained from the correlation operation is higher than a predetermined threshold value, it is determined that the control channel detection signal has been transmitted. Therefore, the UE performs blind decoding with respect to a reception signal in a search space corresponding to the control channel detection signal in step 1104. The UE obtains DCI through the result of the blind decoding in step 1105.

However, when it is determined that the correlation value is less than the threshold value in step 1103, the UE decides not to perform blind decoding with respect to a reception signal in the corresponding resource region (that is the corresponding search space) in step 1106, and the UE may ignore the reception signal on the corresponding search space.

Figure 12:
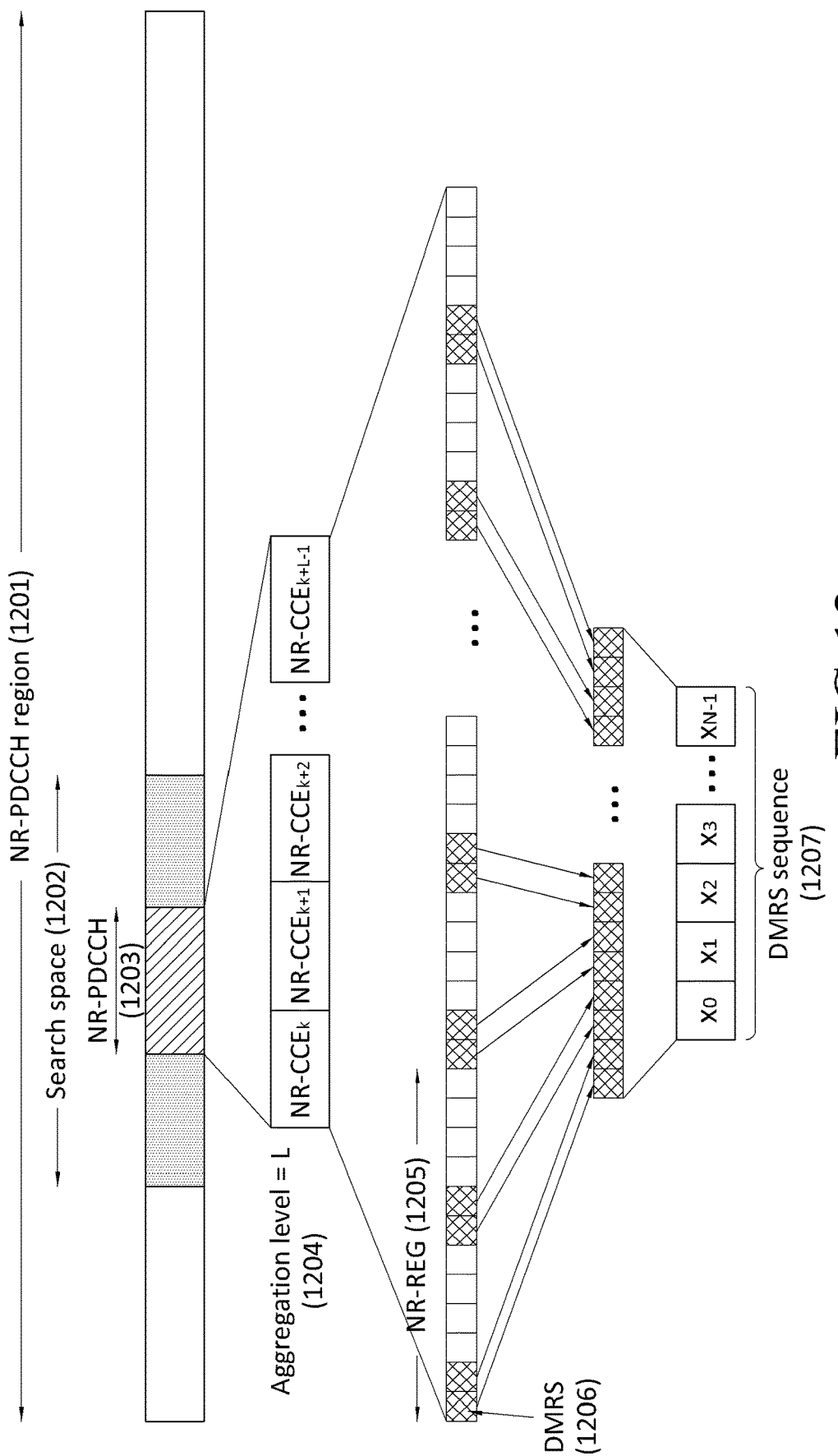
FIG. 12 illustrates a downlink control channel transmission according to an embodiment of the present disclosure.

FIG. 12 illustrates a downlink control channel transmission according to an embodiment of the present disclosure.

Referring to FIG. 12, an NR-PDCCH region 1201 includes a search space 1202, which may be a common search space or a UE-specific search space. An NR-PDCCH 1203 may be transmitted by being mapped to a resource region in the search space 1202.

The NR-PDCCH 1203 may be transmitted, including an aggregation level L 1204. The NR-PDCCH 1203 includes L NR-CCEs {NR-CCE$_k$, NR-CCE$_{k+1}$, . . . , NR-CCE$_{k+L-1}$}, according to the aggregation level L 1204.

Each NR-CCE includes a plurality of NR-REGs 1205 (PRBs or basic resource units of an NR-PDCCH). A DMRS 1206 used for decoding an NR-PDCCH may be transmitted in at least one NR-REG 1205. The DMRS 1206 used for decoding the NR-PDCCH may be transmitted in only a resource region in which the NR-PDCCH 1203 is actually allocated in the search space 1202. The DMRS 1206 includes a predetermined sequence, such as a pseudo random sequence defined in Equation (3). In FIG. 12, a DMRS sequence 1207 having a length of N, i.e., {$x_0, x_1, \ldots, x_{N-1}$}, is used.

The DMRS sequence 1207 may be configured to be different based on whether the RS is a common RS or a UE-specific RS. For example, when the DMRS 1206 is a common/shared RS, the DMRS 1206 may include a common sequence agreed among all UEs, and the sequence may be generated using information, e.g., a cell ID. However, when the DMRS 1206 is a UE-specific/PDCCH-specific RS, the DMRS 1206 may include a UE-specific sequence, and the UE-specific sequence may be generated using information, e.g., a UE ID.

An eNB may transmit a DMRS in a resource region to which an NR-PDCCH is allocated. The UE determines whether the DMRS 1206 of the UE is transmitted in the entire search space 1202, before performing blind decoding for an NR-PDCCH. When it is determined that the DMRS 1206 of the UE is transmitted in a NR-PDCCH candidate (or candidates), the UE may perform blinding decoding with respect to the NR-PDCCH candidate (or candidates).

Figure 13:
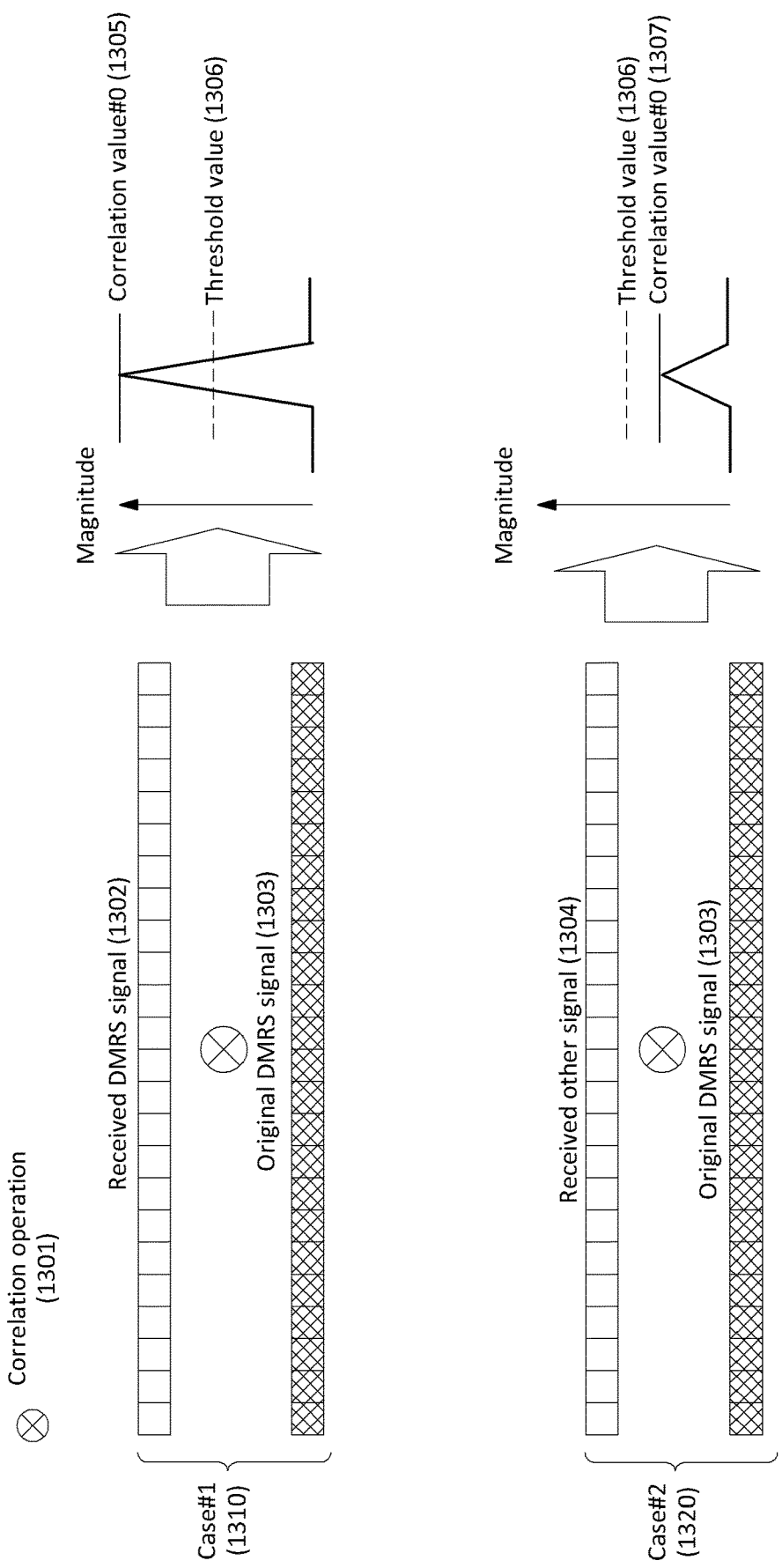
FIG. 13 illustrates detection of a DMRS according to an embodiment of the present disclosure.

FIG. 13 illustrates detection of a DMRS according to an embodiment of the present disclosure.

Referring to FIG. 13, a UE may determine whether a DMRS is transmitted by performing a correlation operation 1301 (e.g., as defined by Equation (5)), as described above. When a correlation value between a received signal and a previously known DMRS sequence is higher than a predetermined threshold value, the UE may assume that the DMRS has been transmitted.

FIG. 13 includes case #1 1310s in which an eNB transmits a predetermined DMRS 1303 and a UE receives the DMRS, and case #2 1320s in which an eNB transmits a signal irrelevant to the predetermined DMRS 1303 (or transmits nothing) and a UE receives the signal.

In case #1 1310, in which the eNB transmits the predetermined DMRS 1303, the UE performs the correlation operation 1301 for a received signal 1302 and the previously known DMRS 1303. The received signal 1302 shows high correlation with the DMRS 1303, and thus, a high correlation value 1305 may be obtained as a result of the correlation operation 1301. The correlation value 1305 may be higher than a predetermined threshold value 1306, whereby the UE may assume that the DMRS 1303 has been transmitted.

In case #2 1320, in which the eNB transmits a signal that is irrelevant to the predetermined DMRS 1303, the UE performs the correlation operation 1301 for a received signal 1304 and the previously known DMRS 1303. The received signal 1304 shows low correlation with the DMRS 1303, and thus, a low correlation value 1307 may be obtained as a result of the correlation operation 1301. The correlation value 1307 may be lower than the predetermined threshold value 1306, whereby the UE may assume that the DMRS 1303 has not been transmitted.

Figure 14:
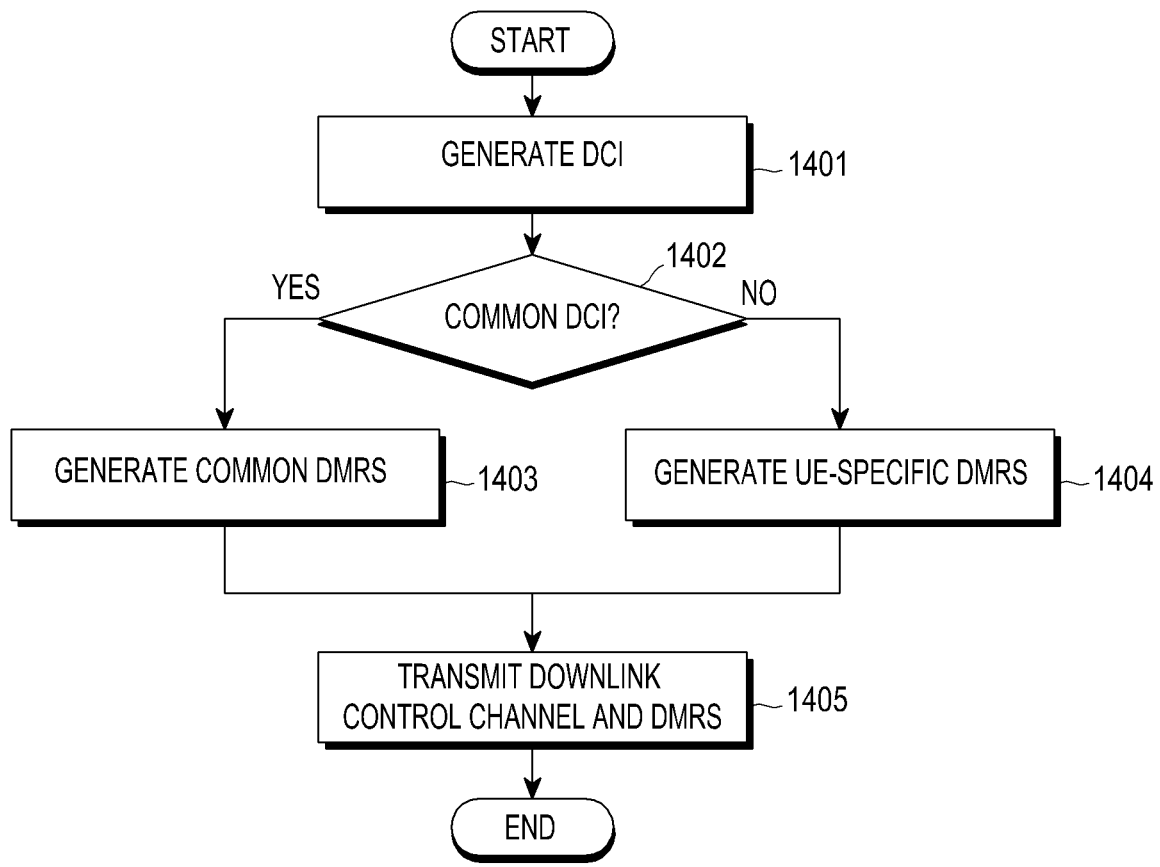
FIG. 14 is a flowchart illustrating a method of transmitting a downlink control channel and a DMRS by an eNB according to an embodiment of the present disclosure.

FIG. 14 is a flowchart illustrating a method of transmitting a downlink control channel and a DMRS by an eNB according to an embodiment of the present disclosure.

Referring to FIG. 14, an eNB generates DCI in step 1401.

In step 1402, the eNB determines whether the generated DCI is common DCI, which is broadcasted to a plurality of UEs, or UE-specific DCI, which is unicasted to a specific UE.

When it is determined that the DCI is common DCI, the eNB generates a corresponding DMRS (e.g., a common DMRS) in step 1403. However, when it is determined that the DCI is a UE-specific DCI, the eNB generates a corresponding DMRS (e.g., UE-specific DMRS) in step 1404.

In step 1405, the eNB transmits a signal of a downlink control channel (e.g., an NR-PDCCH) and the generated DMRS used for decoding the generated downlink control channel to a UE through a corresponding resource region.

Figure 15:
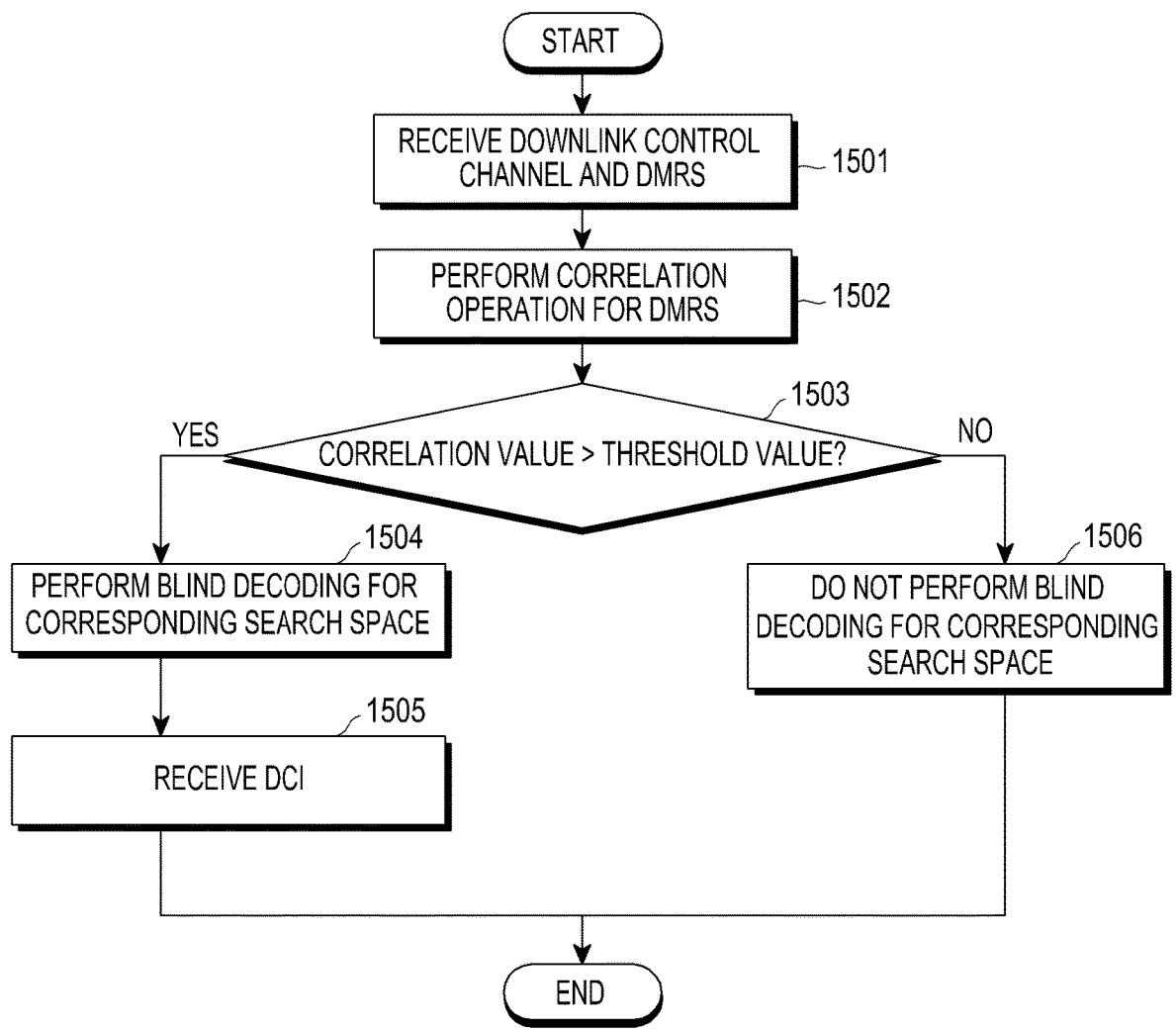
FIG. 15 is a flowchart illustrating a method of receiving a downlink control channel and a DMRS by a UE according to an embodiment of the present disclosure.

FIG. 15 is a flowchart illustrating a method of receiving a downlink control channel and a DMRS by a UE according to an embodiment of the present disclosure.

Referring to FIG. 15, a UE receives a downlink control channel (e.g., an NR-PDCCH) and a signal of a resource region to which a DMRS used for decoding the downlink control channel is mapped in step 1501.

In step 1502, the UE performs a correlation operation for the received signal and a previously known DMRS.

In step 1503, the UE determines whether a DMRS has been transmitted based on the result of the correlation operation.

When a correlation value obtained from the correlation operation is higher than a predetermined threshold value, the UE determines that the DMRS has been transmitted and performs blind decoding with respect to a reception signal (predetermined NR-PDCCH candidate or candidates) in a search space corresponding to the DMRS in step 1504. The UE obtains DCI through the result of the blind decoding in step 1505.

However, when it is determined that the correlation value is less than the threshold value in step 1503, in step 1506, the UE does not perform blind decoding with respect to the search space (predetermined NR-PDCCH candidate or candidates), which is determined as a space where the DMRS has not been transmitted.

When an NR-PDCCH is monitored using a DMRS, a threshold value used for detecting a DMRS may be set through a scheme similar to a scheme of setting a threshold value used for detecting a control channel detection signal, as described above.

Figure 16:
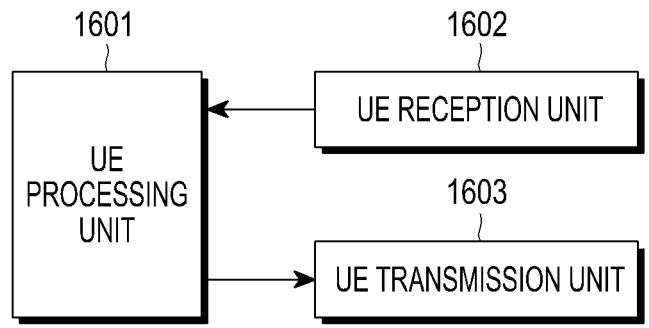
FIG. 16 illustrates a UE according to an embodiment of the present disclosure.

FIG. 16 illustrates a UE according to an embodiment of the present disclosure.

Referring to FIG. 16, the UE includes a processing unit 1601, a reception unit 1602, and a transmission unit 1603. The processing unit 1601 may perform a series of processes executed by the UE according to at least one of or a combination of at least two of the above described embodiments of the present disclosure. For example, the processing unit 1601 may control an NR-PDCCH monitoring operation and an NR-PDCCH blind decoding operation of the UE, based on NR-PDCCH configuration information, DMRS configuration information, configuration information on a control channel detection signal and sequence, threshold value setting information, etc., according to at least one of the embodiments of the present disclosure.

The reception unit 1602 and the transmission unit 1603, which may be commonly referred to as a transceiving unit, may transmit/receive a signal to/from an eNB. The signal may include control information and data. The reception unit 1602 and the transmission unit 1603 may include a radio frequency (RF) transmitter that up-converts and amplifies a frequency of a transmitted signal, an RF receiver that low-noise amplifies a received signal and down-converts the frequency, etc. The reception unit 1602 and the transmission unit 1603 may output a signal to the processing unit 1601 by receiving the signal through a radio channel, and transmits a signal output from the processing unit 1601 through a radio channel.

Figure 17:
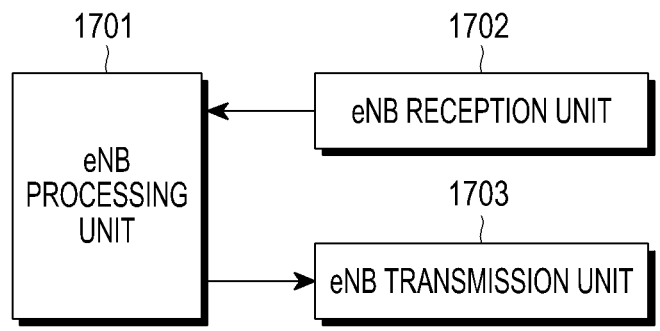
FIG. 17 illustrates an eNB according to an embodiment of the present disclosure.

FIG. 17 illustrates an eNB according to an embodiment of the present disclosure.

Referring to FIG. 17, the eNB includes a processing unit 1701, a reception unit 1702, and a transmission unit 1703.

The processing unit 1701 may perform a series of processes executed by the eNB according to at least one of or a combination of at least two of the above described embodiments of the present disclosure. For example, the processing unit 1701 may control DCI generation, NR-PDCCH resource allocation and transmission, and the transmission of a DMRS and a control channel detection signal, which are performed by the eNB, based on NR-PDCCH configuration information, DMRS configuration information, configuration information on a control channel detection signal and sequence, threshold value setting information, etc., according to at least one of the embodiments of the present disclosure. The processing unit 1701 may perform scheduling associated with an uplink/downlink control channel and data channel based on an NR-PDCCH transmission mode, and may indicate configuration information to a UE. The reception unit 1702 and the transmission unit 1703, which may be commonly referred as a transceiving unit, may transmit/receive a signal to/from an UE. The signal may include control information and data. The reception unit 1702 and the transmission unit 1703 may include an RF transmitter that up-converts and amplifies a frequency of a transmitted signal, an RF receiver that low-noise amplifies a received signal and down-converts the frequency, etc. Also, the reception unit 1702 and the transmission unit 1703 may output a signal to the processing unit 1701 by receiving the signal through a radio channel, and transmit a signal output from the processing unit 1701 through a radio channel.

According to the above described embodiments of the present disclosure, a next generation radio cellular communication system provides a low-power monitoring scheme for a downlink control channel, wherein the number of times that blind decoding is performed with respect to a downlink control channel may be significantly reduced. Therefore, a UE's power consumption may be reduced and energy-efficient UE operations are allowed.

Particular aspects of the present disclosure may be implemented as a computer-readable code in a computer-readable recording medium. The computer-readable recording medium may be a data storage device, which can store data which can be read by a computer system. Examples of the computer readable recording medium may include a Read- Only Memory (ROM), a Random Access Memory (RAM), a CD-ROM, a magnetic tape, a floppy disk, an optical data storage device, and a carrier wave (such as data transmission through the Internet). The computer-readable recording medium may be distributed through computer systems connected to the network, and accordingly, the computer-readable code may be stored and executed in a distributed manner. Further, functional programs, codes and code segments for achieving the present disclosure may be easily interpreted by programmers skilled in the art which the present disclosure pertains to.

The above-described methods and apparatuses according to embodiments of the present disclosure may be implemented in the form of hardware, software, or a combination of hardware and software. Any such software may be stored, e.g., in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. A method according to an embodiment of the present disclosure may be implemented by a computer or portable terminal including a controller and a memory, wherein the memory is one example of machine-readable storage media suitable to store a program or programs including instructions for implementing the embodiments of the present disclosure.

Accordingly, the present disclosure includes a program for a code that implements the apparatus and method described in the appended claims of the specification and a machine (a computer or the like)-readable storage medium for storing the program. Further, the program may be electronically carried by any medium such as a communication signal transferred through a wired or wireless connection, and the present disclosure appropriately includes equivalents thereof.

Further, an apparatus according to various embodiments of the present disclosure may receive the program from a program providing device that is wiredly or wirelessly connected thereto, and may store the program. The program providing device may include a program including instructions through which a program processing device performs a preset content protecting method, a memory for storing information required for the content protecting method, a communication unit for performing wired or wireless communication with the program processing device, and a controller for transmitting the corresponding program to a transceiver at the request of the program processing device or automatically.

While the present disclosure has been particularly shown and described with reference to certain embodiments thereof, it will be understood by those of ordinary skill in the art that various changes in form and details may be made therein without departing from the scope of the present disclosure as defined by the following claims and their equivalents.

What is claimed is:

1. A method of transmitting a downlink control channel in a wireless communication system, the method comprising:
    setting a length of a detection sequence based on an aggregation level for the downlink control channel;
    generating a first detection signal including the detection sequence;
    transmitting, on a first resource region, the first detection signal indicating that the downlink control channel is transmitted, among a plurality of detection signals;
    allocating the downlink control channel to a resource based on the first resource region; and
    transmitting a signal of the downlink control channel on the resource in a search space,
    wherein the length of the detection sequence is set to be long for a high aggregation level of the downlink control channel, and is set to be short for a low aggregation level of the downlink control channel.

2. The method of claim 1, wherein the first detection signal includes one of a common sequence and a user equipment (UE)-specific reference signal sequence used for decoding the downlink control channel.

3. The method of claim 1, wherein the first resource region is included in the search space or is allocated outside the search space.

4. The method of claim 1, further comprising transmitting, to a user equipment (UE), at least one of configuration information of the first detection signal, configuration information of a sequence of the first detection signal, and setting information of a threshold value used for detecting the first detection signal.

5. A method of receiving a downlink control channel in a wireless communication system, the method comprising:
    determining whether a first detection signal among a plurality of detection signals, which indicates that a downlink control channel is transmitted, is received on a first resource region from a base station; and
    when the detection signal is determined as being receive on the first resource region, performing blind decoding of the downlink control channel received on a resource in a search space, the resource determined based on the first resource region,
    wherein each of the plurality of detection signals includes a detection sequence, which is set by the based station based on an aggregation level for the downlink control channel, and
    wherein the length of the detection sequence is set to be long for a high aggregation level of the downlink control channel, and is set to be short for a low aggregation level of the downlink control channel.

6. The method of claim 5, wherein the first detection signal includes one of a common sequence, and a UE-specific reference signal sequence used for decoding the downlink control channel.

7. The method of claim 5, wherein the first resource region is included in the search space or allocated outside the search space.

8. The method of claim 5, further comprising receiving, from the base station, at least one of configuration information of the first detection signal, configuration information of a sequence of the first detection signal, and setting information of a threshold value used for detecting the first detection signal.

9. An apparatus of a base station that transmits a downlink control channel in a wireless communication system, the apparatus comprising:
    a transceiver; and
    a processor configured to:
        set a length of a detection sequence based on an aggregation level for the downlink control channel,
        generate a first detection signal including the detection sequence,
        control the transceiver to transmit the first detection signal indicating that a downlink control channel is transmitted, among a plurality of detection signals, on a first resource region, allocate the downlink control channel to a resource based on the first resource region, generate a signal of the downlink control channel, and control the transceiver to transmit the downlink control channel on the resource in a search space, wherein the length of the detection sequence is set to be long for a high aggregation level of the downlink control channel, and is set to be short for a low aggregation level of the downlink control channel.

10. The apparatus of claim 9, wherein the first detection signal includes one of a common sequence and a user equipment (UE)-specific reference signal sequence used for decoding the downlink control channel.

11. The apparatus of claim 9, wherein the first resource region is included in the search space or is allocated outside the search space.

12. The apparatus of claim 9, wherein the transceiver transmits, to a user equipment (UE), at least one of configuration information of the first detection signal, configuration information of a sequence of the first detection signal, and setting information of a threshold value used for detecting the first detection signal.

13. An apparatus of a user equipment (UE) that receives a downlink control channel in a wireless communication system, the apparatus comprising:

a transceiver configured to receive a signal on a radio channel; and a processor configured to:

determine whether a first detection signal among a plurality of detection signals, which indicates that a downlink control channel is transmitted, is received on a first resource region based on the received signal from a base station, and when the detection signal is determined as being received on the first resource region, perform blind decoding of the downlink control channel received on a resource in a search space, the resource being determined based on the first resource region, wherein each of the plurality of detection signals includes a detection sequence which is set by the based station based on an aggregation level for the downlink control channel, and wherein the length of the detection sequence is set to be long for a high aggregation level of the downlink control channel, and is set to be short for a low aggregation level of the downlink control channel.

14. The apparatus of claim 13, wherein the first detection signal includes one of a common sequence, and a UE-specific reference signal sequence used for decoding the downlink control channel.

15. The apparatus of claim 13, wherein the first resource region is included in the search space or allocated outside the search space.

16. The apparatus of claim 13, wherein the transceiver receives, from the base station, at least one of configuration information of the first detection signal, configuration information of a sequence of the first detection signal, and setting information of a threshold value used for detecting the first detection signal.

* * * * *